(12) United States Patent
Soukhojak et al.

(10) Patent No.: US 8,201,615 B2
(45) Date of Patent: Jun. 19, 2012

(54) HEAT STORAGE DEVICES

(75) Inventors: Andrey N. Soukhojak, Midland, MI (US); David H. Bank, Midland, MI (US); Kalyan Sehanobish, Rochester, MI (US)

(73) Assignee: Dow Global Technologies LLC, Midland, MI (US)

( * ) Notice: Subject to any disclaimer, the term of this patent is extended or adjusted under 35 U.S.C. 154(b) by 140 days.

(21) Appl. No.: 12/389,598

(22) Filed: Feb. 20, 2009

(65) Prior Publication Data
US 2009/0250189 A1    Oct. 8, 2009

Related U.S. Application Data

(60) Provisional application No. 61/030,755, filed on Feb. 22, 2008, provisional application No. 61/061,908, filed on Jun. 16, 2008, provisional application No. 61/074,799, filed on Jun. 23, 2008, provisional application No. 61/074,840, filed on Jun. 23, 2008, provisional application No. 61/074,869, filed on Jun. 23, 2008, provisional application No. 61/074,889, filed on Jun. 23, 2008, provisional application No. 61/090,084, filed on Aug. 19, 2008.

(51) Int. Cl.
*F28D 17/00* (2006.01)
*F28D 19/00* (2006.01)
(52) U.S. Cl. ......................................................... 165/10
(58) Field of Classification Search ................. 165/4, 10
See application file for complete search history.

(56) References Cited

U.S. PATENT DOCUMENTS

| | | | |
|---|---|---|---|
| 2,003,496 A * | 6/1935 | Roe ................................. | 165/10 |
| 2,375,760 A | 1/1942 | Fahnestock | |
| 3,163,209 A | 12/1964 | Shinn | |
| 3,389,534 A | 6/1968 | Pendleton | |
| 3,501,261 A | 3/1970 | Rice et al. | |
| 3,596,034 A | 7/1971 | Mekjean | |
| 3,605,720 A | 9/1971 | Mayo | |
| 4,022,184 A | 5/1977 | Anderson | |
| 4,093,435 A * | 6/1978 | Marron et al. ................... | 165/10 |

(Continued)

FOREIGN PATENT DOCUMENTS
CN    12 639 24 A    8/2000
(Continued)

OTHER PUBLICATIONS

"Hex Web Honeycomb Attributes and Properties: A comprehensive guide to standard Hexcel honeycomb materials, configurations, and mechanical properties," Hexcel Composites (1999). Available at: http://www.hexcel.com/NR/rdonlyres/599A3453-316D-46D6-9AEE-C337D8B547CA/0/HexwebAttributesandProperties.pdf.

(Continued)

*Primary Examiner* — Ljiljana Ciric

(57) ABSTRACT

A device for storing and discharging heat that employs thermal energy storage materials (TESM) and related methods of manufacturing the device. The device includes a housing, an array of capsules within the housing, and TESM contained in the capsules. The device exhibits a high initial power density. The TESM is encapsulated between metal plies. The metal plies may have a thickness on the order of $10^{-1}$ to $10^2$ μm. The capsules may have a thickness from 0.5 mm to 20 mm. The volume fraction of TESM in the housing may be 0.5 or more. The housing includes an inlet, an outlet, and one or more flow paths for flowing a heat transfer fluid through the housing. The flow paths and the capsules are arranged so that the device has the required average initial power density.

19 Claims, 8 Drawing Sheets

U.S. PATENT DOCUMENTS

| | | | |
|---|---|---|---|
| 4,200,441 A * | 4/1980 | Honmann et al. | 165/10 |
| 4,219,074 A | 8/1980 | Hansen | |
| 4,258,677 A | 3/1981 | Sanders | |
| 4,270,523 A | 6/1981 | VanHeel et al. | |
| 4,294,078 A | 10/1981 | MacCracken | |
| 4,332,221 A | 6/1982 | Imhof et al. | |
| 4,421,661 A | 12/1983 | Claar et al. | |
| 4,497,305 A | 2/1985 | Ozawa | |
| 4,504,402 A | 3/1985 | Chen et al. | |
| 4,505,953 A | 3/1985 | Chen et al. | |
| 4,565,242 A * | 1/1986 | Yano et al. | 165/10 |
| 4,574,051 A | 3/1986 | Matthews et al. | |
| 4,609,036 A | 9/1986 | Schrader | |
| 4,657,067 A | 4/1987 | Rapp et al. | |
| 4,713,944 A | 12/1987 | Januschkowetz | |
| 4,793,402 A * | 12/1988 | Yano et al. | 165/10 |
| 4,807,696 A | 2/1989 | Colvin et al. | |
| 4,931,333 A | 6/1990 | Henry | |
| 4,976,308 A | 12/1990 | Faghri | |
| 4,993,481 A * | 2/1991 | Kamimoto et al. | 165/10 |
| 5,076,248 A | 12/1991 | Schatz | |
| 5,085,790 A | 2/1992 | Hormansdorfer | |
| 5,101,801 A | 4/1992 | Schatz | |
| 5,211,334 A | 5/1993 | Schatz | |
| 5,220,954 A | 6/1993 | Longardner et al. | |
| 5,299,630 A | 4/1994 | Schatz | |
| 5,307,780 A | 5/1994 | Dodge | |
| 5,348,080 A | 9/1994 | Kuroda et al. | |
| 5,355,688 A | 10/1994 | Rafalovich et al. | |
| 5,449,571 A | 9/1995 | Longardner et al. | |
| 5,465,585 A | 11/1995 | Mornhed et al. | |
| 5,507,337 A | 4/1996 | Rafalovich et al. | |
| 5,558,055 A | 9/1996 | Schatz | |
| 5,570,667 A | 11/1996 | Gray et al. | |
| 5,591,374 A | 1/1997 | Kniep et al. | |
| 5,613,578 A | 3/1997 | Moseley et al. | |
| 5,649,409 A | 7/1997 | Gujer et al. | |
| 5,722,482 A * | 3/1998 | Buckley | 165/10 |
| 5,728,316 A | 3/1998 | Kniep et al. | |
| 5,750,962 A | 5/1998 | Hyatt | |
| 5,765,511 A | 6/1998 | Schatz | |
| 5,770,295 A | 6/1998 | Alderman | |
| 5,785,884 A | 7/1998 | Hammond | |
| 5,871,041 A | 2/1999 | Rafalovich | |
| 5,916,530 A | 6/1999 | Maus et al. | |
| 5,927,381 A | 7/1999 | Bednarek et al. | |
| 5,938,114 A | 8/1999 | Zeyen et al. | |
| 6,083,418 A | 7/2000 | Czarnecki et al. | |
| 6,102,103 A | 8/2000 | Zobel et al. | |
| 6,131,565 A | 10/2000 | Mills | |
| 6,170,268 B1 | 1/2001 | Elfert et al. | |
| 6,209,500 B1 | 4/2001 | Tallio et al. | |
| 6,253,571 B1 | 7/2001 | Fujii et al. | |
| 6,291,803 B1 | 9/2001 | Fourrey | |
| 6,612,293 B2 | 9/2003 | Schweinzer et al. | |
| 6,627,106 B1 | 9/2003 | Lotz et al. | |
| 6,645,598 B2 | 11/2003 | Alderman | |
| 6,701,742 B2 | 3/2004 | Mack et al. | |
| 6,784,356 B1 | 8/2004 | Czarnecki et al. | |
| 6,875,407 B1 | 4/2005 | Biel, Jr. et al. | |
| 6,889,751 B1 | 5/2005 | Lukas et al. | |
| 7,007,491 B2 | 3/2006 | Grimm et al. | |
| 7,096,925 B2 | 8/2006 | Bracciano | |
| 7,131,281 B2 | 11/2006 | Salim et al. | |
| 7,144,557 B2 | 12/2006 | Yada et al. | |
| 7,147,071 B2 | 12/2006 | Gering et al. | |
| 7,156,155 B2 | 1/2007 | Kudo | |
| 7,159,643 B2 | 1/2007 | Kudo | |
| 7,222,659 B2 | 5/2007 | Levin | |
| 7,225,860 B2 | 6/2007 | Baginski et al. | |
| 7,246,496 B2 | 7/2007 | Goenka et al. | |
| 7,246,506 B2 | 7/2007 | Takao et al. | |
| 7,275,379 B2 | 10/2007 | Zeng et al. | |
| 7,287,581 B2 | 10/2007 | Ziehr et al. | |
| 7,297,814 B2 | 11/2007 | Yada et al. | |
| 7,303,001 B2 | 12/2007 | Leu et al. | |
| 7,316,262 B1 | 1/2008 | Rini et al. | |
| 7,325,595 B2 | 2/2008 | Homan et al. | |
| 7,514,419 B2 | 4/2009 | Erion et al. | |
| 7,829,552 B2 | 11/2010 | Erion et al. | |
| 8,091,613 B2 * | 1/2012 | Bank et al. | 165/10 |
| 8,122,943 B2 * | 2/2012 | Haller et al. | 165/10 |
| 2002/0043068 A1 | 4/2002 | Carr et al. | |
| 2002/0139114 A1 | 10/2002 | Dickau | |
| 2004/0115113 A1 | 6/2004 | Ohrem | |
| 2004/0154784 A1 | 8/2004 | Pause | |
| 2004/0194908 A1 | 10/2004 | Tomohide | |
| 2004/0256082 A1 | 12/2004 | Bracciano | |
| 2005/0132736 A1 | 6/2005 | Grimm et al. | |
| 2006/0101997 A1 | 5/2006 | Py et al. | |
| 2006/0124892 A1 | 6/2006 | Rolland et al. | |
| 2006/0231233 A1 | 10/2006 | Farid et al. | |
| 2006/0293086 A1 | 12/2006 | Haws et al. | |
| 2007/0031652 A1 | 2/2007 | Bellemare | |
| 2007/0033951 A1 | 2/2007 | Goenka et al. | |
| 2007/0214819 A1 | 9/2007 | Patel et al. | |
| 2008/0211230 A1 | 9/2008 | Gurin | |
| 2008/0289793 A1 | 11/2008 | Geiken et al. | |
| 2009/0211726 A1 | 8/2009 | Bank et al. | |
| 2010/0133464 A1 | 6/2010 | Tomura | |
| 2010/0147486 A1 | 6/2010 | Vetrovec | |

FOREIGN PATENT DOCUMENTS

| | | |
|---|---|---|
| DE | 1208730 B | 1/1966 |
| DE | 2639173 A1 | 3/1978 |
| DE | 28 21 69 90 A1 | 11/1979 |
| DE | 32 45 026 A | 6/1984 |
| DE | 32 45 027 A1 | 6/1984 |
| DE | 38 19 2 23 A | 12/1988 |
| DE | 3929900 A1 | 3/1991 |
| DE | 90 15 510 U1 | 3/1992 |
| DE | 41 33 360 A1 | 4/1992 |
| DE | 42 09 4 27 A1 | 8/1993 |
| DE | 1 96 298 83 A1 | 2/1997 |
| DE | 1 98 453 98 C1 | 3/2000 |
| DE | 1 99 343 37 C1 | 5/2001 |
| DE | 20 2005 017835 U1 | 1/2006 |
| DE | 20 2005 015393 U1 | 10/2006 |
| EP | 01 262 48 A1 | 11/1984 |
| EP | 02 130 38 A1 | 3/1987 |
| EP | 02 162 37 A2 | 4/1987 |
| EP | 09 169 18 A2 | 5/1999 |
| EP | 09 169 18 A3 | 5/2000 |
| EP | 13 613 42 A1 | 11/2003 |
| EP | 13 630 85 A1 | 11/2003 |
| EP | 1085177 B1 | 1/2005 |
| EP | 17 127 80 A3 | 11/2006 |
| EP | 11 992 06 B1 | 7/2007 |
| EP | 12 709 35 B1 | 8/2007 |
| EP | 1972675 A2 | 9/2008 |
| FR | 1417527 A | 11/1965 |
| FR | 28 071 11 A1 | 10/2001 |
| GB | 21 251 56 A | 2/1984 |
| JP | 51 126 980 A | 11/1976 |
| JP | 03/083057 A | 3/2003 |
| JP | 03/090689 A | 3/2003 |
| JP | 2004/176877 A | 6/2004 |
| JP | 2005/076454 A | 3/2005 |
| JP | 2005/325706 A | 11/2005 |
| JP | 2005/330832 A | 12/2005 |
| JP | 2007/107844 A | 4/2007 |
| RU | 20 805 37 C1 | 5/1997 |
| SE | 97 015 33 A | 10/1998 |
| WO | 79/01004 A1 | 11/1979 |
| WO | 89/09249 A1 | 10/1989 |
| WO | 93/12193 A1 | 6/1993 |
| WO | 94/02257 A2 | 2/1994 |
| WO | 94/08196 A1 | 4/1994 |
| WO | 94/21976 A1 | 9/1994 |
| WO | 95/20721 A1 | 8/1995 |
| WO | 96/07021 A1 | 3/1996 |
| WO | 98/11397 A1 | 3/1998 |
| WO | 00/060236 A1 | 10/2000 |
| WO | 01/92129 A | 12/2001 |
| WO | 2006/029463 A1 | 3/2006 |
| WO | 2007/114309 A1 | 10/2007 |
| WO | 2008/050210 A | 5/2008 |

| | | |
|---|---|---|
| WO | 2008/071205 A1 | 6/2008 |
| WO | 2008/112122 A2 | 9/2008 |
| WO | 2009/53245 A1 | 4/2009 |

OTHER PUBLICATIONS

"KNO3—LiNO3" Data from FTsalt FACT salt databases, available at, http://www.crct.polymtl.ca/fact/phase_diagram.php?file=KNO3-LiNO3.jpg&dir=FTsalt, (Aug. 24, 2005).

"LiBr-LiNO3" Data from FTsalt FACT salt databases, available at, http://www.crct.polymtl.ca/fact/documentation/FTsalt/LiBr-LiNO3.jpg, (Aug. 24, 2005).

"LiCl-LiNO3" Data from FTsalt FACT salt databases, available at, http://www.crct.polymtl.ca/fact/phase_diagram.php?file=LiCl-LiNO3.jpg&dir=FTsalt, (Aug. 24, 2005).

"LiNO3-NaNO3" Data from FTsalt FACT salt databases, available at, http://www.crct.polymtl.ca/fact/phase_diagram.php?file=LiNO3NaNO3.jpg&dir=FTsalt, (Aug. 24, 2005).

"RubiTherm CSM-Panels" Concept for air heating systems, Rubitherm GmbH. Available at: http://www.rubitherm.com/english/pages/03e_air_heating_systems.htm, (Nov. 3, 2001).

"Thermal Management with Phase Change Materials", Merck KGaA (EM Industries, Inc.) Available at: http://pb.merck.de/servlet/PB/show/1014580/pcm_br_eng.pdf, (Jun. 2002).

A.N. Campbell and E.T. Van Der Kouwe, "Studies on the thermodynamics and conductances of molten salts and their mixtures. Part VI. Calorimetric studies of sodium chlorate and its mixtures with sodium nitrate" Canadian Journal of Chemistry, 46, 1287-1291 (1968).

Andreas Hauer, "Innovative Thermal Energy Storage Systems for Residential Use", Bavarian Center for Applied Energy Research, ZAE, Bayern. Available at: http://mail.mtprog.com/CD_Layout/Poster_Session/ID188_Hauer_final.pdf, (2003).

Bauer et al., "PCM-Graphite Composites For High Temperature Thermal Energy Storage," Proceedings of the 10$^{th}$ International Conference on Thermal Energy Storage, New Jersey (2006).

Buschle et al., *Analysis of steam storage systems using Modelica*, (Sep. 4-5, 2006) (German Aerospace Center (DLR), Institute of Technical Thermodynamics, Stuttgart, Germany), The Modelica Association 235-242 (2006). Available at: http://www.modelica.org/events/modelica2006/Proceedings/sessions/Session3a1.pdf.

Colvin et al. "Twenty Years of Encapsulated PCM Development in the United States: Coolants, Composites, Powders, Coatings, Foams, Fibers, and Apparel." Triangle Research and Development Corporation, (2003).

Co-pending PCT Application No. PCT/US2009/034680 filed Feb. 20, 2009, Published as WO 2009/105643 on Aug. 27, 2009.

Dincer et al., "Thermal Energy Storage Methods", *Thermal Energy Systems and Applications*, 93-212, John Wiley & Sons, London (2002).

Edie News, "Heat 'Batteries' Dramatically Cut Energy Use, GreenBiz.com," May 26, 2006. Available at: http://www.greenbiz.com/news/2006/05/26/heat-batteries-dramatically-cut-energy-use.

Freitas et al., "Mathematical Modeling and Simulation of Heat Transfer in a Thermal Battery," (Sep. 5-8, 2006) (European Conference on Computational Fluid Dynamics ECCOMAS CFD) TU Delft, The Netherlands (2006).

H. Mehling and S. Hiebler, "Review on PCM in buildings- current R&D," (Jul. 7-9, 2004) (6th Workshop IEA Annex 17 'Advanced Thermal Energy Storage through Application of Phase Change Materials and Chemical Reactions—Feasibility Studies and Demonstration Projects', Arvika, Sweden). Available at: http://www.fskab.com/annex 17/Workshops/EM6%20Arvika/ Presentations/Annex17%20Harald%20Mehling.pdf.

Janz et al., "Melting and Pre-Melting Phenomena in Alkali Metal Nitrates," J. Chem. Eng. Data, 133-136, 9(1) (1964).

Juhani Laurikko, "On exhaust emissions from petrol-fuelled passenger cars at low ambient temperatures," (May 23, 1998) (Ph.D. dissertation, Helsinki University of Technology) 348 Valtion teknillinen tutkimuskeskus 48-50 (1998).

Kamimoto et al., "Investigation of Nitrate Salts for Solar Latent Heat Storage," Solar Energy, 581-587, 24 (1980).

Kerslake et al., "Analysis of Thermal Energy Storage Material with Change-of-phase volumetric effects," NASA Technical Memorandum 102457, (Feb. 1990). (Also in Journal of Solar Engineering, 22-31, 115(1) (1993), Abstract Only.).

Kim et al., "Thermal Management of Batteries in Advanced Vehicles Using Phase-Change Materials," (Dec. 2-5, 2007) Unpublished Proceedings of EVS 23, Sustainability: The Future of Transportation, Anaheim, CA.

M. Neuschütz, "High performance latent heat battery for cars" (May 27-28, 1999) (3$^{rd}$ Workshop IEA IEA Annex 10 'PCMs and Chemical Reactions for Thermal Energy Storage', Helsinki, Finland). Available at: http://www.fskab.com/annex10/WS_pres/WS3/neuschuetz.pdf.

P.I. Protsenko, R.P. Shisholina, "System from lithium and potassium nitrites and nitrates," Zhurnal Neorganicheskoi Khimii, 2744- 2747, 8(12) (1963). Abstract Only.

Peng et al., "High-temperature thermal stability of molten salt materials," International Journal of Energy Research, 1164-1174, 32 (2008).

Sanders et al., "Engine Heating Device. Final Report." Sponsor: Department of Energy, Washington, D.C. (0858860000 9520250), (Jan. 1, 1986).

Schatz, "Cold Start Improvement by use of Latent Heat Stores," SAE. 921605, Aug. 1, 1992.

Sharma and Sangara "Latent Heat Storage Materials and Systems a Review," International Journal of Green Energy, 1-56, 2 (2005).

R.P. Shisholina, P.I. Protsenko, "The System Li, Na ∥ NO$_2$, NO$_3$," Zhurnal Neorganicheskoi Khimii, 2741-2743, 8(12) (1963). Abstract Only.

Takahashi et al., "Heat capacities and latent heats of LiNO$_3$, NaNO$_3$, and KNO$_3$," International Journal of Thermophysics, 1081-1090, 9(6) (1988).

Tamme et al., "Latent heat storage above 120° C for application in the industrial process heat sector and solar power generation," International Journal of Energy Research, 264-271, 32 (2008).

Yuvaraj et al., "Thermal Decomposition of Metal Nitrates in Air and Hydrogen Environments," J. Phys. Chem. B., 1044-1047, 107 (2003).

Co-pending Office Action mailed May 12, 2011, U.S. Appl. No. 12/389,416, filed Feb. 20, 2009.

Nakagawa, Tadashi, et al., Exhaust Heat Recirculation System for Actual Fuel Economy, JSAE Technical Report vol. 61, No. 7, 2007, pp. 1-6 (with full English language translation).

PCT International Preliminary Report on Patentability from the International Bureau, PCT/US2009/034647, mailed Oct. 28, 2010.

\* cited by examiner

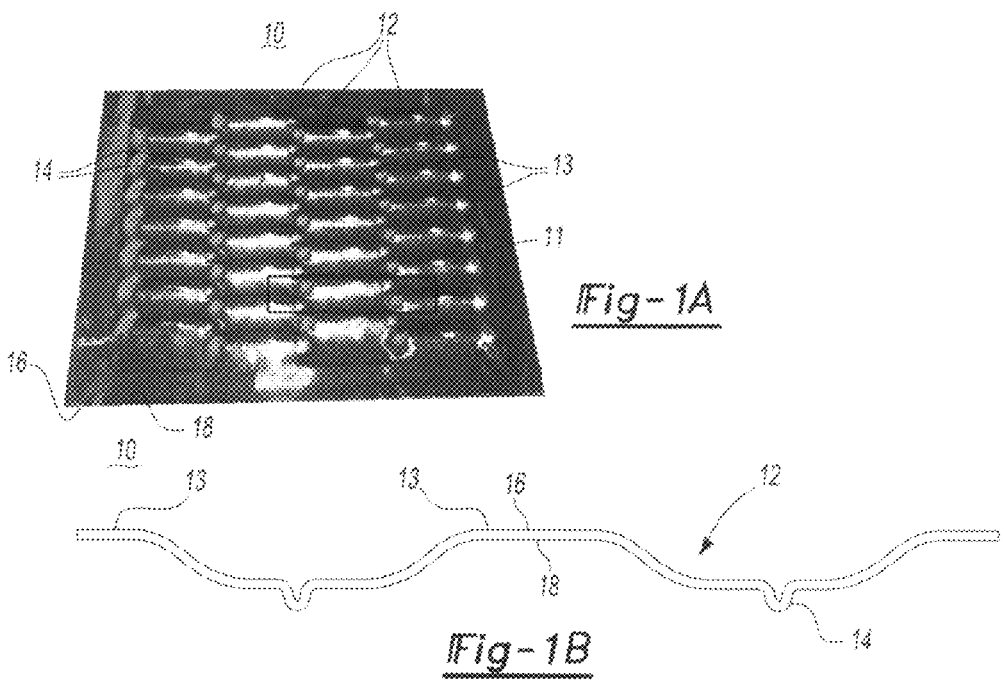
*Fig-1A*
*Fig-1B*
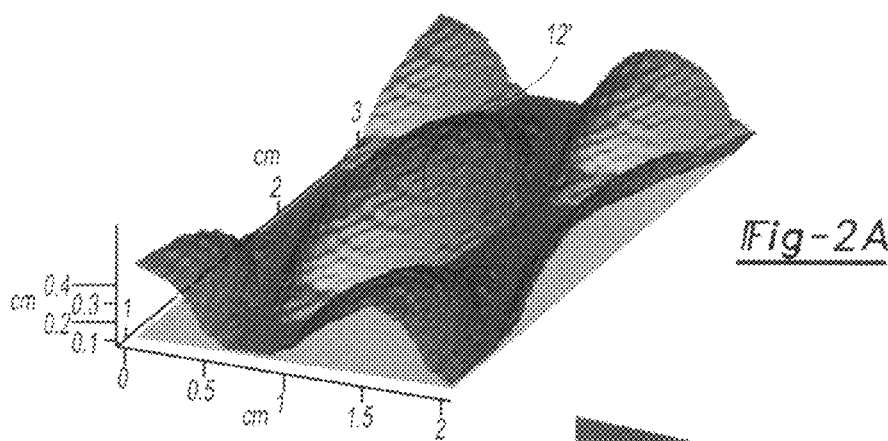
*Fig-2A*
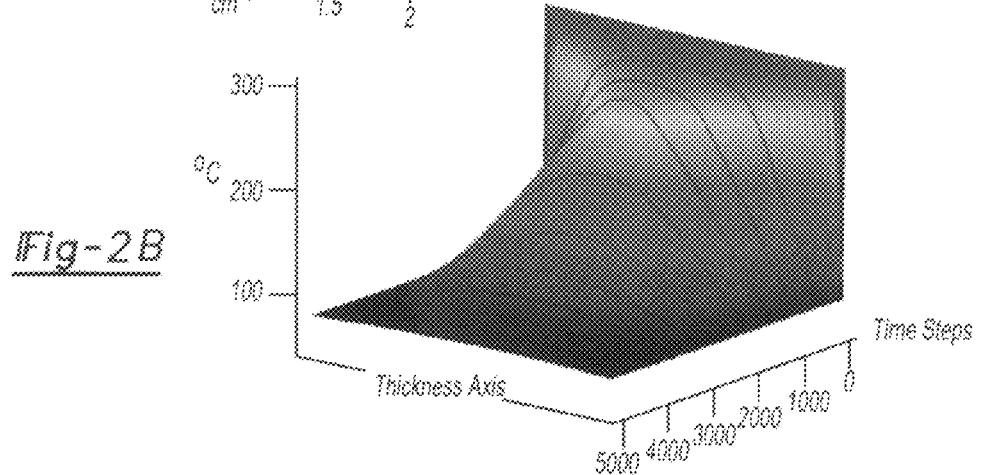
*Fig-2B*

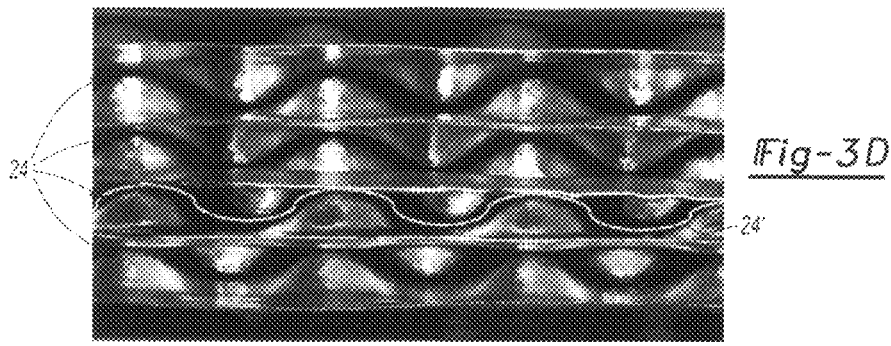
Fig-3D
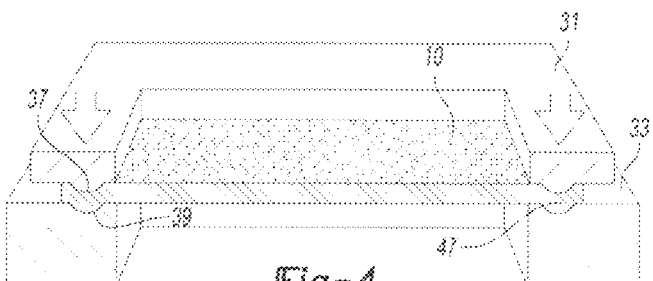
Fig-4
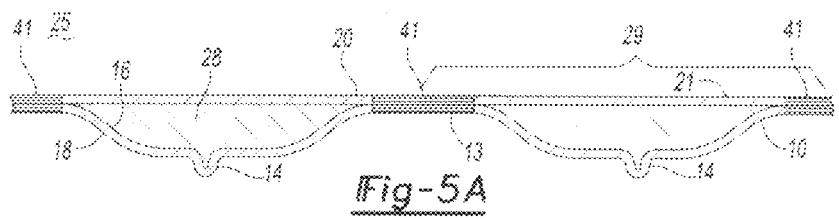
Fig-5A
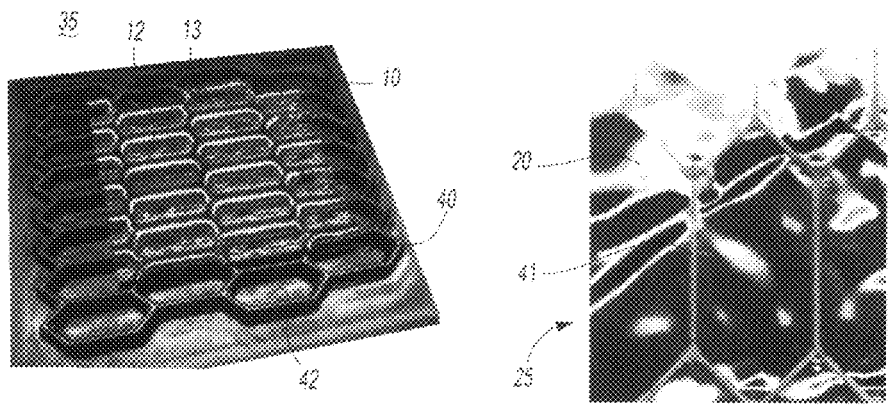
Fig-5B
Fig-5C

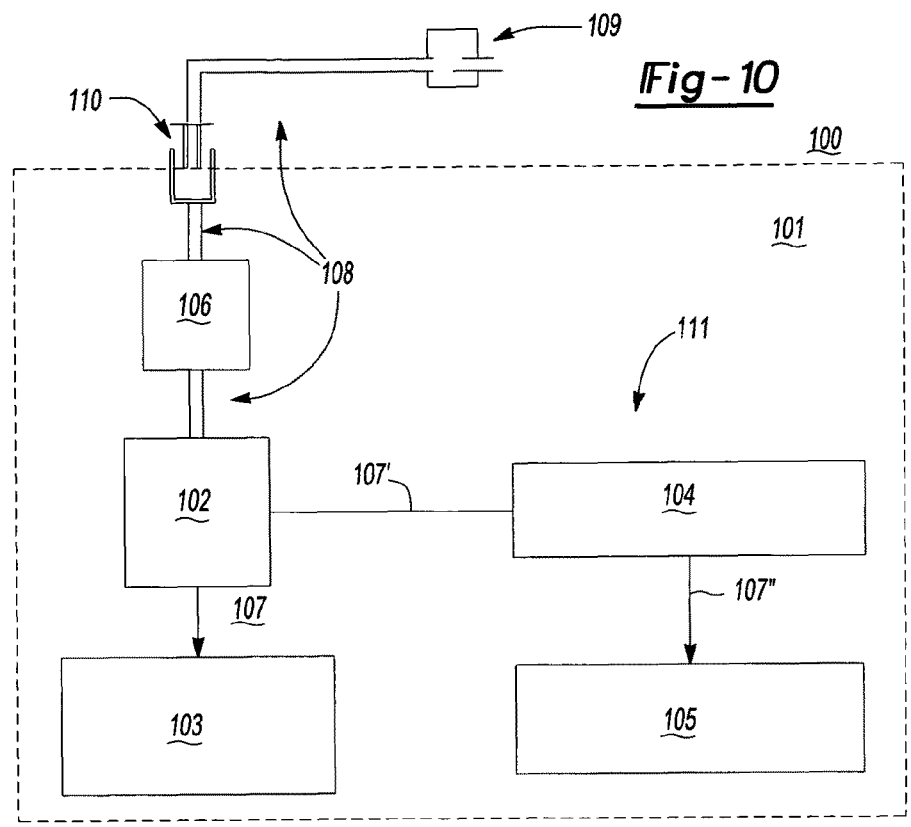
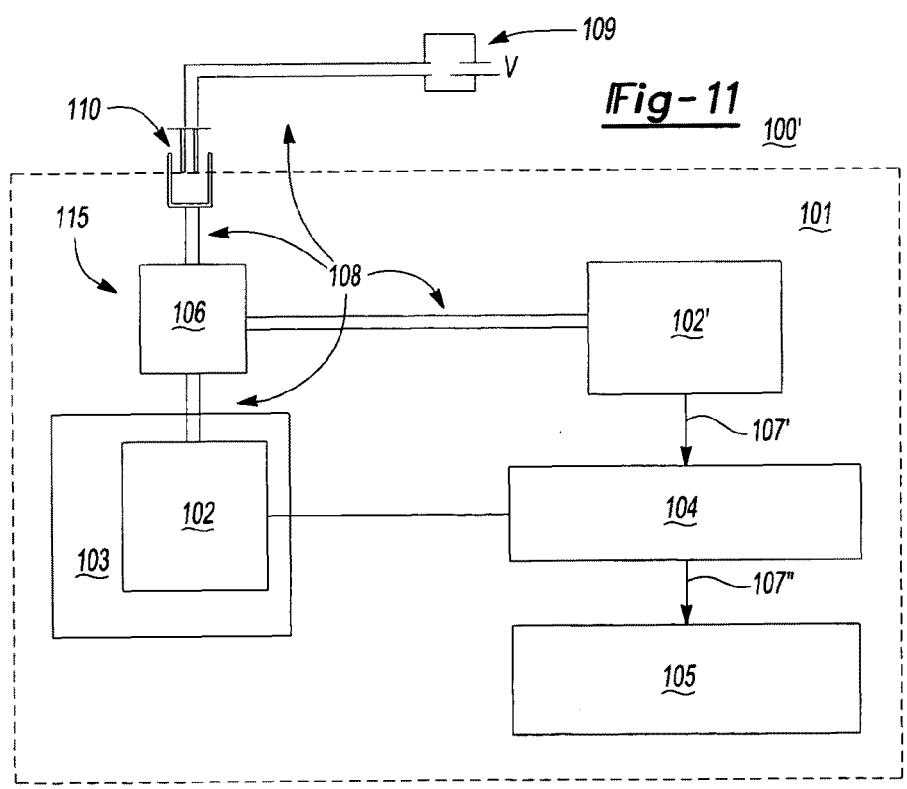

HEAT STORAGE DEVICES

CLAIM OF PRIORITY

The present application claims the benefit of the filing date of U.S. Provisional Patent Application Nos. 61/030,755 (filed on Feb. 22, 2008); 61/061,908 (filed on Jun. 16, 2008), 61/074,799 (filed on Jun. 23, 2008); 61/074,840 (filed on Jun. 23, 2008), 61/074,869 (filed on Jun. 23, 2008); 61/074,889 (filed on Jun. 23, 2008); and 61/090,084 (filed on Aug. 19, 2008), and U.S. patent application Ser. No. 12/389,416 entitled "THERMAL ENERGY STORAGE MATERIALS" filed on Feb. 20, 2009, the contents of which are hereby incorporated by reference in their entirety.

FIELD OF THE INVENTION

The present invention relates generally to heat storage devices containing a thermal energy storage material (TESM) that are useful in storing and discharged heat and in particular to TESM packaging for such devices.

BACKGROUND OF THE INVENTION

Thermal energy storage materials (TESMs) are known and have been used in applications for storing heat for subsequent use. Many TESMs are phase change materials, meaning they undergo a phase change, typically between solid state and liquid state, and can store (or release) a considerable amount of the heat, regarded as latent heat from the phase change. Much attention has been devoted toward devices that contain TESMs, and that use the TESMs to store and discharge thermal energy. Some of these devices have been called "heat batteries". See, e.g., U.S. Pat. Nos. 7,225,860; 6,784,356; and 6,102,103 purport to depict examples of heat batteries. Heat batteries have been proposed for use in a number of applications. For example, U.S. Pat. No. 6,875,407 purports to use a vacuum insulated heat battery for improving catalytic efficiency. Other applications are identified, for example, in U.S. Pat. No. 6,102,103 (addressing engine warming, defrosting, or passenger compartment heating).

Despite efforts to develop such heat storage devices, it is observed that their structures may vary, dependent upon such factors as the desired operating temperatures to which the systems are exposed, the desired rate of heat exchange, the nature of the TESM employed or others. One particular respect in which heat storage devices vary is in the structures employed for containing the TESM. Another is in the manner in which individual containers that hold the TESM interface with any other such containers to afford a desired heat exchange response.

U.S. Pat. No. 7,225,860 purports to depict the use of encapsulation tubes to hold TESM. U.S. Pat. No. 6,102,103 purports to depict a jacket to contain TESM.

An example of an array of capsules carried on a common planar carrier has been offered by a company named Rubitherm GmbH, using a designation CSM Panel. It is believed that those structures, while potentially suitable for paraffin or hydrated salt TESMs, which tend to find utility at relatively low operating temperatures, may be not be suitable for applications subject to more rigorous conditions. In use, it appears that the CSM panels are stacked relative to each other in a housing to define modules through which a heat exchange fluid is passed.

Efforts to achieve good results from an encapsulation technique may further be complicated based upon the application under consideration. For example, some TESMs are very corrosive. Some TESMs will only function over a limited temperature range. Some encapsulation techniques are not sufficiently robust to withstand repeated thermal cycling.

Accordingly, particularly if a TESM system is to be employed efficiently in applications such as those previously attempted, there is a need for a robust TESM encapsulation system that withstands corrosion, provides a large amount of heat storage and transfer per unit volume, withstands relatively high operating temperatures (e.g., to about 300° C. or higher), or any combination thereof. It is also important that any such TESM encapsulation system be sufficiently versatile that it can be incorporated into a heating module in a manner that allows for good thermal efficiency. It is also important that any such TESM encapsulation system (and the systems in which it is introduced) can withstand considerable thermal cycling through the operational temperature range.

SUMMARY OF THE INVENTION

Through its various aspects the present invention meets some or all of the above needs by providing in one broad aspect a device for storing and discharging heat including a housing having an internal volume, wherein the device exhibits an average initial power density of heat transferred to a heat transfer fluid of at least about 8 kW/L based on the internal volume of the housing wherein the average initial power density is defined over the first 30 seconds, wherein the average initial power density is measured using a device having an initial temperature of about 280° C. in the housing, and the heat transfer fluid has an initial temperature of about 10° C.

Aspects of the present invention are also directed at improved way to encapsulate TESMs, pursuant to which at least one first array portion includes at least two opposing plies that are joined in contact with each other over a portion of their respective facing surfaces for defining a first capsular structure including at least one first capsule containing a thermal energy storage material (TESM) and having a predetermined volume.

Aspects of the present invention are additionally directed at a method for producing a heat storage device comprising: i) deforming a first metal foil such that a first ply having a trough is formed; ii) at least partially filling the trough with a thermal energy storage material (TESM); iii) heating the TESM for a time and temperature above the liquidus temperature of the TESM such that the TESM is essentially free of water; iv) placing a second ply of the metal foil on top of the first ply such that a surface of the first ply and a surface of the second ply are in partial contact; and v) sealing a portion of the facing surfaces of the first ply and the second ply, such that a blister pack containing a plurality of capsules containing the TESM is formed, the capsules are in thermal conducting relation with each other, and the TESM is prevented from escaping from the capsules during operation in their intended environment.

A sub-assembly according to the teachings herein further includes the above at least one first array portion and at least one second array portion that includes at least two opposing plies that are joined in contact with each other over a portion of their respective facing surfaces for defining a second capsular structure including at least one second capsule containing a TESM and having a predetermined volume; wherein the first array portion and the second array portion are in substantially adjoining relationship with each other (e.g., in a stacked nesting relationship) to define a flow path therebetween for a heat transfer fluid or other working fluid.

In a particular aspect there is contemplated that the above array portions of encapsulated TESM, the above sub-assemblies or both may be used in a heat storage device for storing heat comprising: 1) an array of capsules within a housing; the array of capsules including a) at least one first array portion that includes at least two opposing plies that are joined in contact with each other over a portion of their respective facing surfaces for defining a first capsular structure including a plurality of capsules containing a thermal energy storage material (TESM) and having a predetermined volume; and b) at least one second array portion that includes at least two opposing plies that are joined in contact with each other over a portion of their respective facing surfaces for defining a second capsular structure including a plurality of capsules containing a TESM and having a predetermined volume; and ii) a flow path defined by the volume between the first array component and the second array component; wherein the first array component and the second array component are separated by a gap thickness, $t_{gap}$, less than about 20 mm; and the device comprises a plurality of flow paths wherein each flow path is generally nonplanar.

Use of the above structures and devices is contemplated for any of an number of processes of reclaiming heat which include the steps of: a) transferring at least a portion of a source heat from a heat source; b) heating the thermal energy storage material using the source heat; c) increasing the amount of the liquid phase in the thermal energy storage material by converting at least a portion of the source heat into latent heat; d) maintaining the amount of the liquid phase in the thermal energy storage material to store the latent heat; e) converting at least a portion of the latent heat into released heat; and f) transferring the released heat to an object to be heated.

Among the many applications for which the above process may be employed are heating applications for transportation vehicles, for buildings, for fluid heating, for power generation, for chemical reactions, for reclaiming waste heat from an industrial application, and others.

BRIEF DESCRIPTION OF THE DRAWINGS

FIG. 1A illustrates a surface of a deformed ply.

FIG. 1B illustrates a cross-section of an exemplary deformed ply.

FIG. 2A shows an encapsulation technology and geometry for encapsulating a TESM.

FIG. 2B illustrates a modeling of the temperature change in a TESM capsule during heat discharge.

FIG. 3D illustrates a cross-section of a flow path transverse to the flow direction.

FIG. 4 illustrates a bead formed while embossing a ply.

FIG. 5A illustrates a cross-section of a diffusion bonded assembly of two plies having an array of capsules containing a thermal energy storage material (e.g. a blister pack).

FIG. 5B illustrates a tooling which may be used for joining two plies.

FIG. 5C illustrates a surface of a second ply after joining.

FIG. 10 illustrates a vehicle component containing one electric heater which may be used to heat both a fluid containing part and a heat storage device.

FIG. 11 illustrates a vehicle component containing two electric heater which may be used to heat both a fluid containing part and a heat storage device.

DETAILED DESCRIPTION OF THE INVENTION

Figure 3A:
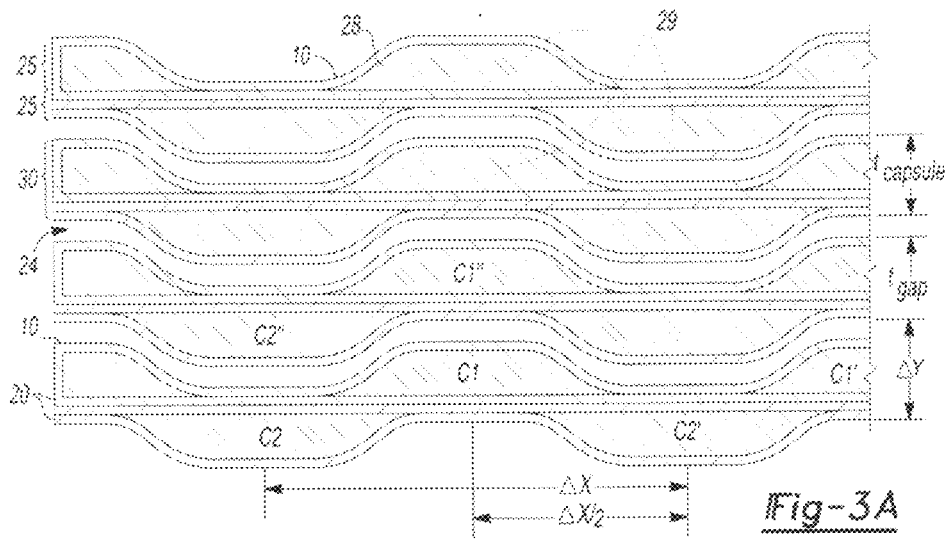
FIG. 3A shows a cross-section in flow direction in a capsular assembly.

As will be seen from the teachings herein, the present invention provides a unique and unexpectedly efficient approach to the packaging and containment of thermal energy storage materials (referred to herein as "TESMs", which also includes what is commonly called "phase change materials") for heat storage and discharge applications. Systems herein exhibit extraordinary high power density capabilities and may be used for removing heat at a rate of at least about 8 kW per liter of system. The teachings herein contemplate the packaging and containment of TESMs in a relatively robust structure that will resist failure due to corrosion, due to thermally induced strains from cyclical thermal loading, or both, and will also yield a relatively high storage and discharge capacity in relation to the overall volume occupied by such structures and systems incorporating them. One of the advantages of the structures herein is that a relatively compact assembly is possible, which exhibits unexpectedly large and rapid heat storage and discharge capabilities. As will be seen, the teachings herein contemplate a manner of packaging discrete amounts of TESM in a plurality of cellular structures. The teachings contemplate the assembly of such cellular structures into a sub-assembly. The teachings also contemplate the incorporation of one or more such sub-assemblies into a module that can be used as part of a system for storing heat and discharging the stored heat. A number of applications made possible or more efficient as a result of such structures, sub-assemblies, modules and/or systems are also contemplated as part of the teachings.

In general, the present teachings contemplate the packaging and containment of TESMs in a manner that provides a volume having a plurality of discrete cellular structures containing TESM distributed throughout the volume in a manner that provides efficient heat exchange between the TESM and any heat exchange fluid or other working fluid that is passed through the volume. For example, as used in a heat storage and discharge system, plural individual capsules may be in thermal conducting relationship with each other, and with a heat transfer fluid of the system.

In one general respect, the packaging and containment of TESM is achieved by use of structures that encapsulate the TESM. The structures preferably will be such that they define a plurality of capsules that contain TESM, and particularly a plurality of capsules carried on a common carrier and defining an array of capsules (e.g., a blister pack having a plurality of individually isolated capsular structures). It is possible that capsules may be in thermal conducting relation with each other. The capsules thus may be carried in an array by a thermally conducting structure. For example, an array may be made of a thermally conductive metal that is formable and generally resistant to corrosion (e.g., a ply, such as a foil, of aluminum, stainless steel or some other suitable material). As will be seen, one preferred approach envisions encapsulating TESM in an embossed metal foil structure.

The capsules may be in a generally ordered relationship (e.g., a repetitive pattern of capsules) among each other in at least two dimensions. One approach, for example, may employ a plurality of substantially equally spaced capsular structures. When a plurality of the capsular structures are used they may have the same shape or size as each other, or they may differ relative to each other. Though the TESM in each capsule of an array may be individually physically isolated relative to an adjoining capsule, it need not necessarily be. It is possible there may be some fluid communication between two or more capsules. An array thus may contain greater than about ten, greater than about twenty five, greater than one hundred, or even greater than one thousand blisters. The capsular structures may include a plurality of capsules that are sealed (e.g., individually or as a group of capsules) in a manner sufficient to prevent the TESM from escaping from the capsules during operation in their intended environment. A preferred structure may be one that provides a relatively high density of heat exchange surface area, as well as one in which a device that employs the array is capable of continuing to function if an individual capsule ruptures or otherwise fails in service.

Capsules may contain any volume of the TESM sufficient for undergoing a phase change to a liquid when exposed to a predetermined thermal condition, and thereafter storing heat while in the liquid state, until subjected to a cooling condition that will cause the liquid to solidify and release the stored heat. Preferably, the capsule contains less than about 200 ml (as measured at about 25° C.), more preferably less than 50 ml of the TESM, more preferably less than about 10 ml, even more preferably less than about 4 ml, and most preferably less than about 3 ml (e.g., less than about 2 ml), and/or having a volume greater than about 0.1 ml, and more preferably greater than about 0.3 ml). Other volumes (larger or smaller) may also be used. Although small capsules may be used, the total volume of TESM in the device may be large if the device contains many capsules. For example, without limitation for an array (or a subassembly as described herein) having a relatively large number of capsules, the total volume of the TESM carried in the array (or sub-assembly) may be greater than about 100 ml, possibly greater than about 400 ml, greater than about 700 ml and or even greater than about 1,200 ml. There may even be applications which require much larger volumes of TESM, e.g. greater than 4 liters of TESM. Applications calling for greater than 10, 100, or even 1000 liters or more of TESM in a system are also within the present teachings. The present invention affords a unique approach that allows such unexpectedly large volumes of TESM to be contained within a relatively small overall packaging volume and yet to realize efficient heat storage, discharge and transfer.

The shape of the capsules in any array may take any of a variety of suitable forms that afford a desired packing density of the capsules within a predetermined housing volume, while also affording a desired thermal performance. By way of example, the teachings herein contemplate the possible use of capsules that are generally spherical. However, more preferably, the capsular structures may have a generally elongated shape that, as compared with the packing density of spherical shaped capsules, will yield an increased heat transfer rate between a heat exchange fluid and the capsules as compared with the heat transfer rate of spherical shaped capsules of the same volume.

The capsular structures thus may have an elongated shape that is generally ellipsoidal, hexagonal, or otherwise includes a major axis (i.e., the axis in the direction of elongation of the shape) that is longer than a minor axis. The elongation direction may be such that it is generally the same as or parallel to the direction of flow of a heat transfer fluid or other working fluid in a system of the present teachings (e.g. a coolant, an exhaust gas, a convected gas from a heat pipe, or otherwise). In this manner it may be possible to reduce the hydraulic resistance of the device without sacrificing the heat exchange (throughput) rate, which is limited in part by the smallest dimension of the capsules (e.g. the thickness of the capsules) containing the TESM (which may be a low thermal conductivity substance).

The length of the capsules in the along the major axis of the capsules may preferably be from about 0.5 mm to about 100 mm (e.g., from about 10 to about 50 mm), but longer or shorter capsules may be used. The thickness of the capsule, $t_{capsule}$, (i.e., in the direction perpendicular to the plane of any plies used to make an array) preferably is from about 0.5 mm to about 20 mm, more preferably from about 1 mm to about 15 mm, and most preferably from about 2 mm to about 10 mm. The width of the capsule preferably is from about 0.3 to about 70 mm, (e.g., from about 2 to about 40 mm). Preferably the ratio of the length to width is greater than about 1, more preferably greater than about 3, and most preferably greater than about 5.

The teachings herein also contemplate that there will be a region in each array between adjoining capsules. That region is expected to include some curvature. Thus it is possible that the region between capsules is generally free of planar sections between capsules that are larger than about 30% (and more preferably about 15%) of length of the minor axis of the capsules. It is possible that the region between capsules is generally free of planar sections between capsules that are larger than about 5 mm, and more preferably 2 mm.

One or more arrays herein may be used in any suitable manner. It is possible that one or more arrays are used in array portions to form a sub-assembly having a plurality of capsules from more than one array portion arranged in a three-dimensional configuration. For example at least one first array portion and the at least one second array portion may be (i) integrally formed as a unitary structure (e.g., it may be a single array that is folded, wound, or otherwise configured to achieve the desired resulting sub-assembly), (ii) separately formed and assembled together (e.g., two separately made arrays that are stacked relative to each other), or (iii) a combination of (i and ii).

One preferred approach employs at least two array portions of capsules that are in opposing and generally nesting relation to each other, but which are sufficiently configured and spaced to define a flow passage between them, through which heat transfer fluid or other working fluid may be passed. As will also be seen, the teachings herein also contemplate modules that include the subassemblies, and methods for using TESM encapsulated in accordance with the teachings. The flow path within a pair of opposing nesting arrays generally will have substantially continuous path from one end or side of each array to another. The flow path may include a plurality of branches so that the flow path overall (though possibly including linear segments) will generally be non-linear. For example the flow path may include a plurality of substantially linear segments interconnected by branches generally angularly disposed (e.g., by an obtuse angle) relative to each other.

One approach herein envisions a sub-assembly that includes a pair of array portions (e.g., a pair of blister packs), each having a ply having a plurality of troughs therein that carry TESM (the "trough ply") and a ply that overlies and preferably seals the trough ply (the "cover ply"). The cover play is joined to the trough ply to seal TESM within the array. For example, the cover ply is joined to the trough ply by diffusion bonding, by laser welding, or by some other joining technique. Optionally, the resulting joint will be free of any adhesive. Joining of the plies may be such that at least a major amount, if not substantially the entirety of the periphery, of each of the troughs will be joined. The joining may permit for a flow passage between two or more troughs (e.g., between a plurality of adjoining troughs), so that TESM may flow between troughs. The joint between opposing plies (e.g., the trough ply and the cover ply) may be such that a bead (e.g., a substantially continuous bead) or other seam is formed that has generally parallel side walls that penetrate both of the joined plies. A metallurgical bond may be formed between the bead or other seam and each of the joined plies.

In one such preferred sub-assembly, the pair of arrays are stacked relative to each other to define a flow passage between them. The flow passage may be of a relatively constant geometry, dimension, or both. For example, one attractive approach is to stack the pair of arrays nestingly relative to each other so that the trough plies are in direct opposing relation to each other, and the cover plies are generally parallel to each other and have the trough plies disposed between them. In terms of a first array (A1) and a second array (A2), the plies would be arranged in the sequence: cover $ply_{A1}$-trough $ply_{A1}$-trough $ply_{A2}$-cover $Ply_{A2}$. As between trough $ply_{A1}$ and trough $Ply_{A2}$, there may be periodically located spacers, such as spacers that are formed integrally in the trough plies (e.g., formed as part of a plurality of troughs of the troughs plies, such as nubs formed along a distal wall surface of the trough plies), spacers that are added (e.g., bonded or adhered) to one or both plies, spacers that are placed between trough $ply_{A1}$ and trough $ply_{A2}$ (e.g., a wire, a mesh, a bead, and the like), or any combination thereof.

To further illustrate the teachings herein, reference may be made to the drawings depicting an illustrate approach to the encapsulation of TESM. FIG. 1A illustrates an embossed first ply 10, having a pattern 11 of troughs 12. The bottom surface (i.e. the second surface) 18 of the embossed first ply 10 (e.g., a trough ply) has a plurality of troughs 12 (e.g., about 30 troughs in this example). The troughs 12 are arranged in a generally staggered configuration. For the depicted embodiment they are also in a generally polygonal (e.g., rectangular) array, with a plurality of (e.g., two) troughs per repeating pattern 11 (e.g. one at the corners of the repeating pattern and one at the center of the repeating pattern). As illustrated in FIG. 1A, the troughs may have an elongated structure, e.g. they may be elongated in the flow direction of the heat transfer fluid. FIG. 1A also illustrates a first ply having a plurality of nubs on the bottom surface. In this example, there is one nub 14 at the bottom of each trough, however, more or fewer nubs may be formed. FIG. 1A also illustrates a bottom surface of the first ply which is rough and contains a plurality of wrinkles. The top surface (i.e. the first surface) 16 is not visible in this illustration. Nubs 14 are seen extending from each trough. A plurality of troughs, and possibly even each trough, may be surrounded by a lip 13 region.

FIG. 1B illustrates a cross-section of the first ply 10 (e.g., the trough ply), having a plurality of troughs 12. As depicted, it is possible that one or more of the troughs 12 may have a lip 13 surrounding the trough and separating it from adjacent troughs. Although the lip region 13 in FIG. 1B appears flat, it will be appreciated that this region preferably is a ridge having curvature on either side (e.g., as illustrated in FIG. 1A). It is also possible that the structure is such that fluid communication between spaced apart troughs is possible. The first ply has a first surface 16 (e.g., a top surface) and a second surface 18 (e.g., a bottom surface). Although the bottom surface may generally be facing a downward direction while filling one or more troughs with a TESM, the bottom surface may face any desired direction during the process of manufacturing a heat storage device or while using the heat storage device. The first ply 10 is also seen to have a plurality of nubs 14 protruding from the bottom surface in the region of the troughs. As illustrated in FIG. 1B, these nubs may be integrally formed into the first ply. As described herein, the height of the nubs may define a flow path for a heat transfer fluid. The height of the nubs (e.g., as measured by the distance from the bottom of the nubs to the plane formed from the bottom of the trough) may be greater than about 0.1 mm, preferably greater than 0.2 mm, more preferably greater than about 0.5 mm, and most preferably greater than about 1.0 mm. The height of the nubs preferably be less than 20 mm, more preferably less than about 10 mm, even more preferably less than about 5.0 mm, and most preferably less than about 2.0 mm (e.g., less than about 1.5 mm).

FIG. 2A illustrates one exemplary geometry for the troughs 12' of the first ply (e.g. a geometry which may increase the heat transfer rate of a heat exchanger, a geometry which may allow for a reduced chamber volume, a geometry which may allow for compartmentalizing the TESM into small volumes, a geometry which may permit cooling of the TESM from about 300° C. to about 80° C. in less than about 60 seconds, and the like). FIG. 2B illustrates a 1-dimensional simulation of TESM cooling from 300° C. to 60° C. Such simulations may be used to determine optimal ranges for the height of the troughs, for the distance between troughs, for the height of the spacers or nubs, or any combination thereof.

A cross-section of the capsules taken perpendicular to the second ply reveals that the capsules may have a flat, planar side and an arcuate side. The surface of the arcuate side reveals the 2-dimensional pattern of the capsules, which in this preferred geometry is generally an elongated hexagonal shape. Other geometries may also be used, but preferably the cross-section is a shape (or possibly a set of two or more shapes) which are space filling (i.e. can completely fill a 2-dimensional space). For example, triangles, squares, diamonds, rectangles, and hexagons are common space filling polygons. Similarly the 3-dimensional shape of the capsules may preferably have a shape (or possibly two or more shapes) which are space filling (i.e. can completely fill a 3-dimensional space). Exemplary space-filling 3-dimensional shapes include cubes, blocks, hexagonal tubes, and triangular tubes. Other suitable space filling geometries may have one or more arcuate surfaces. Other preferred geometries include geometries such that two adjoining blister packs have mating surfaces such that the two blisters packs may be stacked in a space filling arrangement.

As seen in FIGS. 3A, 3B, 3C, and 3D, one possible structure for use herein will include a pattern of staggered adjoining troughs (e.g., elongated troughs) that axially overlap each other, thus effectively defining an interdigitated pattern of troughs). For example, the longitudinal ends of transversely adjoining troughs will not be juxtaposed, but (if connected) would form a generally zig-zag pattern.

The surfaces of the capsules which are to be in contact with any heat transfer or other working fluid may also have features which improves the rate at which heat is stored or removed from the capsules. For example, one or more surfaces of the capsules may be sufficiently rough or have a surface texture such that the heat transfer or other working fluid in the flow paths can exhibit turbulent flow along the rough or textured surfaces. The surface texture may be the result of an embossing step, a coating step, an etching step, a grinding step or the like. Additionally, the surfaces of the capsule may contain a plurality of bumps, nubs, or other features which cause the flow path to split and then recombine. Such features may help reduce any variation in the temperature of the heat transfer fluid. One or more of the surfaces of the capsule may also have a plurality of folds, wrinkles, pleats, dimples, or other nonplanar surface features such that the foil can stretch and cause the volume of the capsules to increase by at least about 10% (e.g. at least about 15%, or even at least about 20%) without opening the capsule. It is possible that a peripheral bead may be formed generally about the periphery of an array. For example, it may be spaced at about 0.5 to about 3 cm from the edge of the array. FIG. 4 illustrates a peripheral bead 47 formed in the first ply 10. Such a bead may be formed by placing the periphery region of the first ply between a frame 31 and a tooling 33, (wherein one of the frame and tooling has a template bead 37 and the other has a mating groove 39) and applying a force. The bead may have any cross-sectional profile (e.g., the bead may be arcuate, v-shaped, half-round, and the like).

The teachings herein also contemplate methods for producing TESM arrays, and devices for storing and discharging heat, comprising the steps of: i) deforming (e.g., embossing) a first metal sheet such that a first ply having a plurality of troughs is formed; ii) at least partially filling a plurality of the troughs with a TESM; iii) placing a second ply of a metal sheet on top of the first ply such that a surface of the first ply and a surface of the second ply are in partial contact; and iv) sealing (e.g. joining) a portion of the facing surfaces of the first ply and the second ply, such that a blister pack containing a plurality of capsules containing the TESM is formed, the capsules are in thermal conducting relation with each other, and the TESM is prevented from escaping from the capsules or array portions during operation in their intended environment.

An array may be formed as a blister pack by embossing or otherwise deforming a thin material sheet to define a pattern in the sheet. For example, a first metal foil (e.g. the metal foil may include at least one layer of brass, copper, aluminum, nickel-iron alloy, bronze, titanium, stainless steel or the like) may be embossed or otherwise deformed to form a first ply having a top surface and a bottom surface. The thin sheet may be selected to have a high coefficient of thermal diffusivity. It may also be possible to use a polymeric sheet or foil having good thermal conductivity characteristics. The thin sheet may be coated, plated, and/or laminated over some or all of its surface with a protective layer to help resist puncture, to enhance or modify heat transfer characteristics or otherwise improve the functionality of the material. The thin sheet may otherwise be coated or surface treated as desired to incorporate a thin layer onto the sheet that differs compositionally, physically or both relative to the underlying base material. The thin layer may have a thickness on the order of about $10^{-1}$ to about $10^2$ μm. For example, the thickness of the thin layer may be on the order of about $10^1$ μm (e.g., from about 2 to about 70 μm), or on the order of $10^2$ μm (e.g., from about 20 to about 700 μm, or from about 40 to about 300 μm). Further, any step of deforming the thin sheet, particularly if the sheet is a metal, may be accompanied by one or more stress relief steps, annealing steps or other steps for improving a property.

The thin sheet may be a generally noble metal or it may be one that includes a metal which has an oxide layer (e.g. a native oxide layer or an oxide layer which may be formed on a surface). The metal foil may otherwise have a substantially inert outer surface that contacts the TESM in operation. One exemplary metal foil is an aluminum foil which comprises a layer of aluminum or an aluminum containing alloy (e.g. an aluminum alloy containing greater than 50 wt. % aluminum, preferably greater than 90 wt % aluminum). Another exemplary metal foil is stainless steel. Suitable stainless steels include austenitic stainless steel, ferritic stainless steel or martensitic stainless steel. Without limitation, the stainless steel may include chromium at a concentration greater than about 10 wt. %, preferably greater than about 13 wt. %, more preferably greater than about 15 wt. %, and most preferably greater than about 17 wt. %. The stainless steel may include carbon at a concentration less than about 0.30 wt. %, preferably less than about 0.15 wt. %, more preferably less than about 0.12 wt. %, and most preferably less than about 0.10 wt. %. For example, stainless steel 304 (SAE designation) containing 19 wt. % chromium and about 0.08 wt. % carbon. Suitable stainless steels also include molybdenum containing stainless steels such as 316 (SAE designation).

When contacted with the TESM, the first ply (typically the first surface of the first ply 16) is preferably resistant to corrosion or has a relatively low rate of corrosion. For example, corrosion resistance of the first ply (e.g., the surface of the first ply in contact with the TESM) may be determined by placing a sample of the first ply having a total surface area of about 60 cm$^2$ into a crucible made of the same material as the first ply and filled with molten TESM. The surfaces of the sample are contacted with the TESM throughout the test, and the crucible is heated in an autoclave purged and filled with an inert gas such as dry nitrogen at about 300° C. for about 45 days. Thus tested, the sample of the first ply upon extraction from the crucible and removal of TESM residue preferably exhibits an absolute value of weight change (e.g., a weight increase due to oxidation, or a weight decrease due to etching) of less than about 6 mg, more preferably less than 3 mg, and most preferably less than about 1 mg. The weight change may be expressed in terms of the ratio of the weight gain to the surface area of the sample being tested. For example the weight gain per surface area may be less than 1 g/m$^2$, preferably less than 0.5 g/m$^2$, more preferably less than 0.17 g/m$^2$ and most preferably less than 0.1 g/m$^2$.

The foil used for forming a cover ply and/or trough ply may have any suitable thickness. The thickness of the foil may be determined to meet any requirement of the blister pack such as the durability of the capsules, the heat transfer rate between the capsule and the heat transfer fluid, weight requirements, cost considerations, and the ability to form the foil (e.g. by embossing or otherwise deforming). Suitable thicknesses of the metal foil may be greater than about 10 μm, preferably greater than about 20 μm, and more preferably greater than about 50 μm. The metal foil may have a thickness less than about 3 mm, preferably less than 1 mm, and more preferably less than 0.5 mm (e.g., less than about 0.25 mm). The deforming step may employ deforming at an elevated temperature, an elevated pressure, or both. The deforming step may be a continuous process (e.g. a process that comprises at least one roll) or a noncontinuous process (e.g. a discrete pressing or stamping process).

The deforming step may also add features to the first ply, including surface features to the bottom surface of the first ply. Without limitation the deforming step may add nubs, bumps or other features to the bottom surface of the first ply, such that the nubs or bumps act as spacers to separate two blister packs when they are stacked, folded or rolled upon each other. Additional features which may be formed include a plurality of dimples, folds, wrinkles or pleats. The deforming step may also impart a surface roughness to the bottom surface of the first ply. By way of illustration, in one embodiment, a deformed ply is characterized as having an elongated trough extending from a first end to a second end. The trough has an upper portion that adjoins a relatively flat portion of the sheet material, and a lower portion that projects away from the flat portion. A spacer nub projects in a direction away from the flat portion in the lower portion. The lower portion also include a texture or other surface topography for providing an increased surface area in the lower portion (e.g., increased in per unit area relative to the topography of a smooth surface, such as by at least about 5% or more, or even at least about 10% or more). The spacer nub may be located generally along a longitudinal centerline of the trough. It may be offset laterally relative to the longitudinal centerline of the trough. It may be located in the center of the trough. It may be located away from the center of the trough and toward an end of the trough. The depth of the spacer nub from the flat portion of the ply will be about 5 to about 50% greater than the depth of the lower portion of the trough from the flat portion of the ply. For example, the trough may be about 10 mm deep along most of its bottom portion, and the spacer nub will extend about 1 or 2 mm deeper. Desirably the spacer nub will extend only partially along the length of the trough, thereby affording lateral spread of heat transfer fluid in operation. Texture may be imparted to any of the plies herein during and as part of the deforming step. It may be a secondary operation, such as a grinding operation, an etching operation or both.

Upon being formed, a trough ply preferably has a plurality of troughs (e.g. pockets or depressions) each capable of holding a quantity of liquid. Surrounding each trough may be a lip (or other elevated region of the ply) which may be used for joining the trough ply to a cover ply.

The surface area of the outer surface of the first ply (e.g., the surface are of the trough ply which may contact a heat transfer fluid), in units of $m^2$ per liter of TESM preferably is greater than 0.02 $m^2/L$, more preferably greater than about 0.1 $m^2/L$, even more preferably greater than about 0.5 $m^2/L$, and most preferably greater than about 0.9 $m^2/L$ (where the volume of the TESM is measured at about 25° C.).

Once formed, one or more of the troughs (preferably each of the troughs) in the first ply may be filled with a TESM, such as a TESM described herein in U.S. patent application Ser. No. 12/389,416 entitled "THERMAL ENERGY STORAGE MATERIALS" filed on Feb. 20, 2009 incorporated by reference. The troughs may be filled with the TESM in the solid state, the liquid state or both. The troughs may be filled substantially entirely or only partially. Filling the troughs with a TESM in a liquid state may more completely fill the trough. If the troughs are filled with a TESM in a solid state, the ply may be heated to allow the TESM to at least partially melt and spread within the trough. One possible approach is to fill some, but not all of the troughs, but allow fluid communication between a plurality of troughs. In this manner, it is possible that in operation there will be transporting of TESM between troughs. It is also possible to fill one or more troughs with ingredients of the TESM, such as separate components of a binary, ternary, quaternary or other multi-component system (e.g., separately fill with a first metal compound and one or more additional metal compounds). Thereafter, the separate components may be heated (e.g., until at least two of the metal compounds are molten), and mixed to form the TESM.

During or after filling with the TESM, a second ply or cover ply having a first surface may be placed on top of the first ply (e.g., the trough ply) such that the first surface of the second ply faces the first surface of the first ply. Optionally, the first ply and the second ply are generally co-extensive. It should be appreciated that the second ply need not be a physically separate sheet, but may be part of the same sheet into which one or more troughs have been formed. That is, it may be possible that the second ply is a relatively flat portion of the sheet that is folded over to cover a portion of the sheet in which one or more troughs have been formed. It is also possible that the second ply is not coextensive with the first ply. For example, the second ply may be a cover member (e.g., a sheet) that is sized and configured for covering the trough and its periphery. In this manner, it may be possible that plural cover members are employed to contain a plurality of troughs. It is also possible that a mass of the TESM may be placed on the cover member or the second ply and then the first ply placed over it in covering relation.

Any of the materials suitable for the first metal ply may be used for the second metal ply. As such, the first metal ply and the second metal ply may be formed of the same or different materials. The second metal ply may have any thickness suitable for the first metal ply. The first and second metal plies may have the same thickness or thickness which are different.

Another possible approach is to form a capsular structure by joining (e.g., diffusion bonding or welding) a plurality of plies together at preselected sealing or joining locations (e.g., at points or nodes, along lines, or both, so as to effectively tuft the plies) and then introducing a fluid between the plies, thereby spreading the plies apart where not joined. The next step may be sealing or joining the plies about a periphery to enclose the TESM and thus preventing it from escaping when in operation. The TESM accordingly is allowed to spread within the confines of the periphery, while the joint locations preserve a flow path when adjoining capsular structures are assembled together (e.g., within an insulated container).

The second ply (e.g., the cover ply) may generally be flat but may also have formed features (e.g. it may be deformed using a process similar to that for the first ply). It is also possible that the second ply is embossed to define one or more structures as well (e.g., troughs). The dimensions of the second ply may be large enough to cover the troughs filled with the TESM. The capsules defined by the troughs of the first ply and the second ply may be sealed to form individual capsular structures, which optionally may be individually isolated capsules that prevent flow of TESM between each other. Desirably, individual capsular structures (whether in fluid communication with each other or not) will be in thermal conducting relation with each other. Desirably the plurality of capsules will also define a flow path between them for a heat transfer fluid to flow and deliver and/or remove heat to the TESMs.

Any suitable means of joining the plies (which may include an intermediate layer) may be used. Without limitation, the step of joining may be accomplished by diffusion bonding, brazing, welding (e.g., laser welding, heat welding, or otherwise), adhesive bonding, or any combination. One preferred method of joining the plies is welding, such as resistance welding, laser welding, friction welding and ultrasonic welding. Preferably the plies are joined by laser welding or ultrasonic welding. These welding processes may be particularly useful for welding plies formed of stainless steel, such as 304 stainless steel having a thickness of about 50 to 200 μm (e.g., about 100 μm).

The resulting joint between opposing plies (e.g., the well ply and the cover ply) may be such that a bead (e.g., a substantially continuous bead) or other seam is formed that has generally parallel side walls that penetrate both of the joined plies. A metallurgical bond may be formed between the bead or other seam and each of the joined plies. Such a bead or metallurgical bond 41 is illustrated in FIG. 5A.

Another method of joining the plies may include diffusion bonding. The diffusion bonding process may include a step of heating the first ply, the second ply, or both and a step of applying a pressure to one or more lips of the first ply and to the second ply. The diffusion bonding process may be a continuous or discontinuous process. The conditions for the diffusion bonding will depend on the materials being bonded and may be determined by experimentation. For example, a process of diffusion bonding aluminum may be at a temperature greater than about 320° C., preferably at a temperature greater than about 340° C., and more preferably at a temperature greater than about 350° C. The pressure required for diffusion bonding may depend on the bonding temperature. For example, at higher bonding temperatures, an acceptable seal may be obtained at a low pressure; whereas at lower bonding temperatures may require a higher pressure. The diffusion bonding pressure may be greater than about 6 MPa, and is preferably greater than about 70 MPa. The diffusion bonding pressure may be less than about 15,000 MPa, and preferably is less than about 5,000 MPa. The diffusion bonding process may be performed at a temperature which is below the melting temperature (e.g. the liquidus temperature) of the metal (e.g. metal alloy) containing foil. The foil used for the first ply, the second ply, or both may also comprise multiple levels (i.e. layers) having different melting or liquidus temperatures. For example, the bonding temperature may be higher than the melting temperature of a level of the ply on the surface being bonded, and the bonding temperature may be lower than the melting temperature of a level of the ply on the surface in contact with a heat source. As such, the foil may have one surface which may be bonded at a predetermined bonding temperature and another surface which is not bonded at the predetermined bonding temperature.

It will be appreciated from the teachings herein that in certain aspects, it may be desirable for the capsules of the blister pack to be essentially free of water. In particular, it may be desirable for the TESM in a capsule to be essentially free of water (i.e., the TESM may have a concentration of water, measured for example by Karl Fischer titration (e.g., using a Sartorius WDS 400) less than about 5000 ppm, more preferably less than about 2500 ppm, 1000 ppm, 500 ppm 400 ppm 350 ppm 250 ppm 100 ppm, 50 ppm, 25 ppm, 10 ppm or even below the detection limit of typical Karl Fisher titration techniques using a sample size of about 1 gram). As such, the process of forming a capsule, or of forming a blister pack may include one or more steps of drying the TESM (or a precursor material used in preparing the TESM), one or more steps of containing the TESM in a sealed (e.g., hermetically sealed) container, one or more steps of storing the TESM in an essentially water-free environment), or any combination thereof. The capsules may be sealed (e.g., hermetically sealed) to prevent water from entering the capsule while in use. The drying of the TESM may include a step of heating the TESM to a drying temperature. Preferably the drying temperature is greater than about 100° C., more preferably greater than about 150° C., even more preferably greater than about 200° C., and most preferably greater than about 250° C. Advantageously, the drying temperature may be greater than the liquidus temperature of the TESM, more preferably at least 25° C. above the liquidus temperature of the TESM, and more preferably at least 50° C. above the liquidus temperature of the TESM. The heating time (i.e., the drying time) may be long enough to remove substantially all of the water or until the TESM is essentially free of water as earlier described. A drying step may also include a step of exposing the TESM to a low humidity (e.g., a water free) environment (such as a vacuum, a dessicant environment, dehumidified environment and the like) having a partial pressure of water less than about 10,000 Pa, preferably less than 1,000 Pa, more preferably less than 100 Pa, even more preferably less than about 1 Pa, and most preferably less than about 0.1 Pa. For example, the atmosphere may contain less than about 100 ppm, 10 ppm, or even 1 ppm water. The drying time (e.g., the time at which the TESM is a liquid) may be greater than about 5 minutes, 10 minutes, 20 minutes, 1 hour, 4 hours, or even greater than 24 hours. Shorter or longer drying times may also be possible. The drying of the TESM may occur at any time (e.g., before, during, or after filling a trough of the first ply with the TESM). In one example, the drying of the TESM may occur after filling a trough of the first ply with the TESM and while heating the first ply for bonding to a second ply. The process may also include one or more steps of storing the material in a relatively dry environment (e.g., in a dessicant containing container, in a glove box with a dry atmosphere, in a hermetically sealed container, under vacuum, and the like), such that the water concentration is maintained at a relatively low concentration (e.g., such that the material continues to be essentially free of water). In a particular attractive approach, the TESM may be dried during a step of filling the troughs of the first ply with the TESM (e.g., by heating the TESM to a filling temperature greater than the liquidus temperature of the TESM, or even at least 25° C. above the liquidus temperature of the TESM, such that the water boils off or evaporates off) and/or during the step of sealing the blister packs (e.g., by heating the TESM filled trough ply to a sealing temperature above a temperature at which the water boils off or evaporates off). Any of the above drying and/or storing steps may be utilized for metal salts, such as lithium salts (e.g., lithium nitrate, lithium nitrite, lithium halides, or any combination thereof, sodium salts (e.g., sodium nitrate, sodium nitrite, sodium halides, or any combination thereof), potassium salts (e.g., potassium nitrate, potassium nitrite, potassium halides, or any combination thereof), or any combination thereof. One or more drying steps may be particularly attractive for salts including one or more metal nitrate, one or more metal nitrite, or any combination thereof.

The structure thus formed may be described as a blister pack, i.e. a structure having a plurality of blister capsular structures which may be spaced in a 2-dimensional or 3-dimensional array. FIG. 5A illustrates an example of a cross-section of a blister pack 25 formed of a first ply 10 and a second ply 20, and having a TESM 28 located in the capsules 29 of the blister pack. The capsules may also have one or more nubs or bumps 14 which may function as spacers. The second ply may have an outer surface 21 which may be flat. The first ply and the second ply may have a bead or metallurgical bond 41, that is preferably is in the lip 13 of the first ply 10. FIG. 5B illustrates a sealing tool 35 which may be used in bonding the first ply to the second ply of the blister pack. A section of a first ply 10 is shown in the sealing tool. When placed in the sealing tool 35, the lips 13 of the first ply 10 are supported by the rim 40 of the tool and the troughs 12 of the first ply hang into the cavities 42 of the tool. The surface of the second ply 20 of a blister pack 25 is illustrated in FIG. 5C. This figure shows the indentations or beads 41 which indicate the regions where the first and second plies have been sealed. These indentions or beads 41 have an elongated hexagon shape as defined by the shape of the troughs of the first ply and the rim 40 of the sealing tool 35 illustrated in FIG. 5B.

With more attention now to sub-assemblies that employ a three-dimensional configuration of one or more arrays according to the present teachings, FIG. 3A illustrates the cross-section of an example of an arrangement of blister packs which may be space-filling and/or allow for a structure with a high concentration of TESM, but still allows for relatively good heat transfer with a fluid that is passed over the structure. As can be seen, an opposing pair of arrays can be nestingly combined relative to each other so that the trough plies are in direct opposing relation to each other, and the cover plies are each spaced to have the trough plies disposed between them, with optional spacers to separate the trough plies. In this illustration, the blister packs 25 having second plies 20 (e.g., cover plies) are arranged in pairs with the second plies (e.g., the trough plies) of the two blister packs in direct opposing relationship (e.g., in contact via a spacer structure) with each other (for at least a portion of the first plies, or even essentially all of the first plies) to form a layer 30 of capsules 29. The capsular structures in FIG. 3A are seen to form an sub-assembly of capsules that may include a repeating alternating pattern capsules, C1 and C2, each associated with a discrete array portion. In general, the repeating pattern may contain one or more capsular structures. Another structure of the two capsules may be located at a distance $\Delta x$ in the x-direction as indicated by C1' and C2'. Similarly another pair of capsules of the repeating structure is located at a distance $\Delta y$ in the y-direction as indicated by C1" and C2". The distance $\Delta y$ is given by the sum of the thickness of the capsule layer, $t_{Layer}=t_{capsule}$, and the spacing between two adjacent capsule layers, $t_{gap}$. This space between the two adjacent layers defines a flow path for a heat transfer fluid, which may be used to provide heat to the capsules and/or remove heat from the capsules. Each flow path may have a cross-sectional area tangential to the direction of flow. The cross-sectional area of a flow path may remain constant along the flow path or it may vary with the position along the flow path. In one aspect of the invention, the cross-sectional area of each flow path may be about the same and remains relatively constant. Even the shape of the cross-section of the flow path (e.g. the width, height, curvature, etc.) may remain relatively constant. It is recognized that there may be some variation in the cross-sectional area of each flow path and in one aspect of the invention, such variation is minimized, e.g. the standard deviation of the cross-sectional area may be less than 15% (or even less than 10%) of the mean cross-sectional area of the flow path. It is also contemplated that the spacing between two or more capsular structures will be occupied by a thermally conductive structure.

Figure 3B:
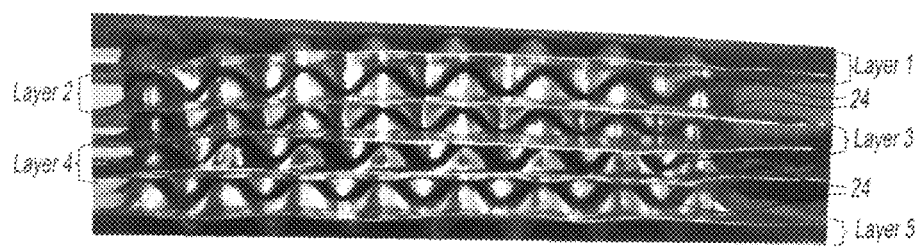
FIG. 3B illustrates a cross-section of a flow path transverse to the flow direction.
Figure 3C:
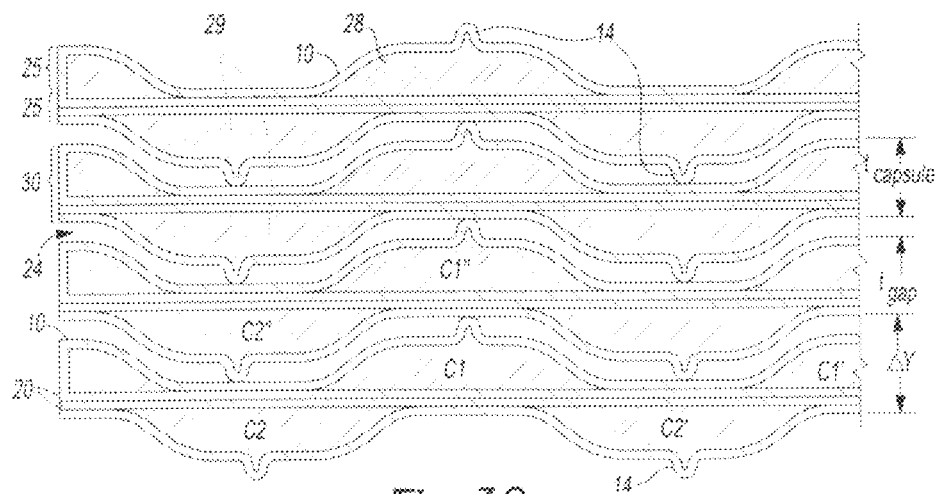
FIG. 3C shows a cross-section in the flow direction of an assembly having spacers.

Neglecting the volume of space occupied by the plies, the volume fraction of the TESM in the 3-dimensional array, $v_{TESM}$, may be given by $v_{TESM}=t_{capsule}/(t_{gap}+t_{capsule})$, or $v_{TESM}\approx t_{capsule}/\Delta y$. Thus, by minimizing, $t_{gap}$, high concentrations of the TESM may be achieved (e.g., $v_{TESM}$ may be greater than 0.5, preferably greater than about 0.7, more preferably greater than about 0.8, and most preferably greater than about 0.9. In practice, the stacking of the blister packs shown in FIG. 3A may result in the adjacent layers becoming in contact with each other and $t_{gap}$ becoming zero (i.e. the flow path for the heat transfer fluid is removed). FIG. 3B illustrates another example of an array of capsules where the flow paths 24 for the heat transfer fluid may have a repeating periodic and generally nonplanar shape. As illustrated, for example, it may include a generally sinusoidal shaped cross-sectional areas as shown. FIG. 3C shows a cross-section similar to FIG. 3A, except for a plurality of spacers 14 for defining or maintaining the gap between adjacent array structures. FIG. 3D is an enlargement of a section of the 3-dimensional array of capsules shown in FIG. 3B. A generally sinusoidal line 24' is added to this figure to better illustrate the cross-section of the flow path 24.

It should be appreciated that even though stacking is illustrated, the invention contemplates any of a number of ways to define a three-dimension array of capsular structures. For example, a 3-dimensional array may be formed by folding a 2-dimensional array of capsular structures upon itself, by rolling a 2-dimensional array of capsular structures upon itself, by radially orienting a 2-dimensional array of capsular structures relative to each other, any combination thereof or otherwise. Array portions may thus result from plural arrays used together (e.g. a pair of blister packs may be folded or wound together), or from a single array (e.g., a single array that is configured, such as by one or more bends or windings, to include a plurality of adjoining layers (which may be corrugations or spiral revolutions) that are generally not coplanar with each other. In one approach, it is contemplated that the capsular structures of plural arrays are brought into complementary relationship with each other. For example they are aligned so that the trough of one portion directly opposes a lip region of another (e.g., inverted) portion and vice versa.

FIGS. 3A and 3C illustrate several benefits of this aspect of the invention. One benefit is the ability to have a relatively high total contact surface area between the capsules and the heat transfer fluid. In this example, this surface area is given by the total surface area of all of the first plies 10 of the blister packs 25. By reducing $t_{capsule}$ (i.e. $t_{Layer}$) and $t_{gap}$ by the same factor, 1/k, and increasing the number of blister packs by the factor k, the contact surface area may be increased by the factor k. The selection of the thickness of the layers may depend on the application and the rate at which heat needs to be stored or removed. A second benefit of the array structure exemplified in FIG. 3A, may be the ability to provide a large number of small capsules, thus allowing the use of a TESM which for any benefit prefers or requires storage in small quantities.

A benefit of the array structure of capsules is the ability to use capsule geometries which can stack to form a high concentration of the TESM. The concentration of the TESM may be higher than the concentration which can be achieved by filling a volume with spheres having a radius r, each containing the TESM. The array structure may permit the concentration of the TESM (e.g., at about 25° C.) to be greater than about 50%, preferably greater than about 60%, more preferably greater than about 70%, even more preferably greater than about 75%, and most preferably greater than about 80% (e.g., greater than about 90%) of the total volume needed to contain the 3-dimensional array structure. For example, ten square arrays each being 10 cm per side are stacked to form a 10 cm tall structure. The total volume needed to contain the 3-dimensional array structure would be about 1000 cm³. TESM thus would occupy at least about 500 cm³, more preferably at least about 600 cm³, and so on.

As indicated, blister packs may be "nesting" such that two facing trough plies are in close proximity (e.g., in direct contact or separated by a distance of less than about 1 mm) with each other over a portion of their respective surface. The two facing trough plies may be in close proximity over at least 10%, preferably at least 20%, more preferably at least 40%, and most preferably at least about 60% of the total area of their facing surfaces. The gaps between the two facing first plies may form a pipe-like flow path, such as illustrated in FIG. 6.

Figure 6:
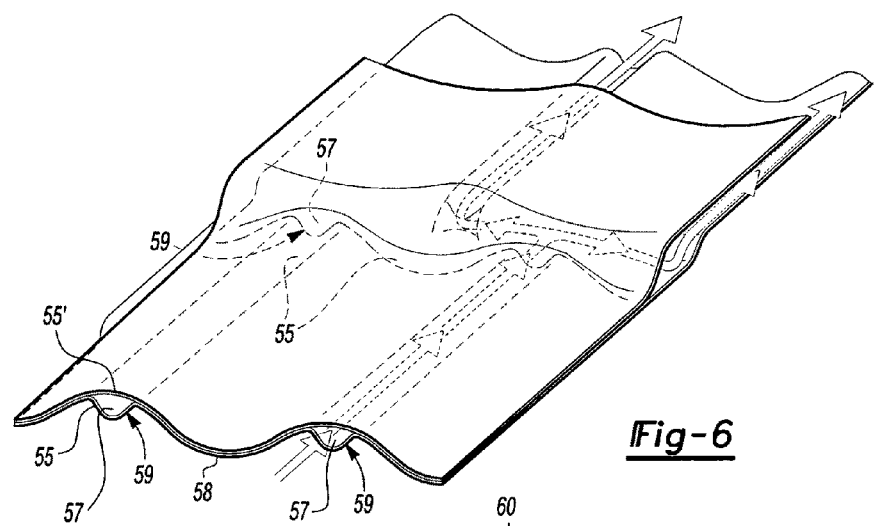
FIG. 6 illustrated the interface between two capsular structures which results in a pipe-like flow path.

FIG. 6 illustrates a schematic of an interface of two blister packs that nest together. The first ply of the first blister pack 55 and the first ply of the second blister pack 55' have a region in which the two facing surfaces are in contact 58. The first ply of the first blister pack 55 has an indentation or groove 59 in its trough, such that a gap 57 is formed when the two blister packs are nested together. The indentation 59 in each capsule creates the flow path for the heat transfer fluid. FIG. 6 illustrates a pair of blister packs in which each capsule of one blister pack has a groove or indention and each capsule of the mating blister pack does not have a groove or indention. As illustrated in FIG. 6, the stacking of blister packs may be free of nubs or spacers. It is also possible for both blister packs to have indentions in some or all of the capsules, such that the heat transfer fluid may contact some or all of the capsules which contain an indention. Preferably the flow paths touches the outer surface of at least 30%, preferably at least about 50%, more preferably at least about 60%, and most preferably at least about 70% of the capsules. As can be seen from the illustrations herein, as a result of the use of a staggered pattern of elongated capsular structures, it is possible that nested sub-assemblies herein will include a plurality of generally interdigitated elongated capsular structures in generally opposing relation to each other.

The flow paths 24 may have any shape or dimension. The height (e.g., the mean height) of the flow path, $t_{gap}$, may preferably be less than about 20 mm and more preferably less than 5 mm, where $t_{gap}$ is only defined for the area of the flow path that does not have a spacer. It may be preferable for the variability of $t_{gap}$ to be low. For example, the standard deviation of the height of the flow path $\sigma_{gap}$ may be much smaller than $t_{gap}$, such that $\sigma_{gap}<0.3\ t_{gap}$ or more preferably $\sigma_{gap}<0.1\ t_{gap}$. The flow paths may further be designed such that the flow rate in a first flow path, v1, and the flow rate in a second flow path, v2, do not differ by more than about 33% (e.g. $0.67\ v1<v2<1.5\ v1$). Preferably v1 and v2 are such that $0.9\ v1<v2<1.11$. To improve the heat transfer rate and or the flow of the heat transfer fluid, it may be desirable for the height of the flow path to vary from the start of the flow path to the end of the flow path. The flow near the center of the flow path may be laminar, such that the resistance to flow is decreased or it may be turbulent such that heat transfer with the fluid near the surface is improved. It is possible that the flow path may be substantially straight. It is possible that the flow path may include a plurality of substantially straight segments that are connect in a branching configuration. It is possible that the flow path may include one or a plurality of arcuate segments. For example, it is possible that the flow path may include a generally periodic and repeating sinusoidal shape. For example, the surfaces of the array portion may define a flow path that has a varying height (e.g., repeatedly varying between a minimum and a maximum height).

Referring again to FIG. 5A, the two opposing plies (10 and 12) of at least one of the array portions may be asymmetrical relative to each other (e.g. one of the plies is generally flat and the other is arcuate (e.g. the other is an embossed ply)).

Another example of a 3-dimensional array of capsules may be a structure that includes layers of a honeycomb structure which are stacked with a gap to allow a heat transfer fluid to flow between adjacent layers. A single layer of the honeycomb capsules may be formed using a honeycomb shaped sheet material (e.g. an aluminum honeycomb sheet available from Hexcel or a similarly shaped structure from other metallic materials such as stainless steel) having a hexagonal or an elongated hexagonal pattern. Opened cells which can hold a liquid may be formed by sealing or otherwise joining a surface of the honeycomb sheet to a ply of aluminum or other suitable material. Another step may include filling some or all of the opened cells with a TESM and then providing a second ply (e.g. a second ply of aluminum) and covering the opened cells with the second ply. A step of sealing or otherwise bonding the second ply to the honeycomb sheet may be used to form the plurality of sealed cells (i.e. capsules). A 3-dimensional array of capsules may be formed by stacking a plurality of the sealed honeycomb sheets filled with the TESM. One or both plies my have spacers or other means of maintaining a gap when layers of the sealed honeycomb sheets are stacked.

The present teachings also contemplate heat storage devices, modules and systems that employs a TESM. In one broad sense, the present teachings contemplate the use of a TESM in a heat storage device, module or system that includes a housing (e.g., an insulated container or other suitable housing), a heat source and/or heat collector for heating the TESM so that the TESM undergoes a solid to liquid phase transition, and a suitable structure or mechanism that transfers heat from the housing such that the device, module, or system provides heat derived from a later liquid to solid phase transition.

Figure 7A:
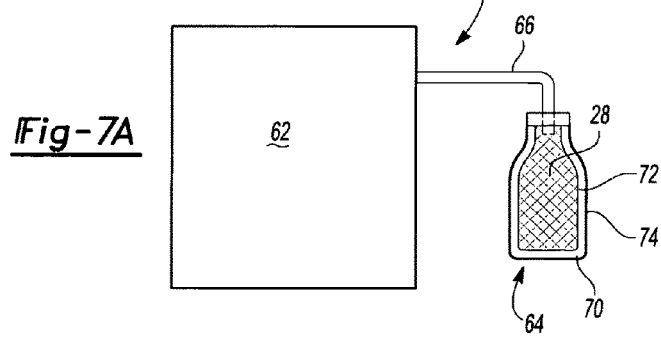
FIGS. 7A and 7B show examples of heat storage systems.
Figure 7B:
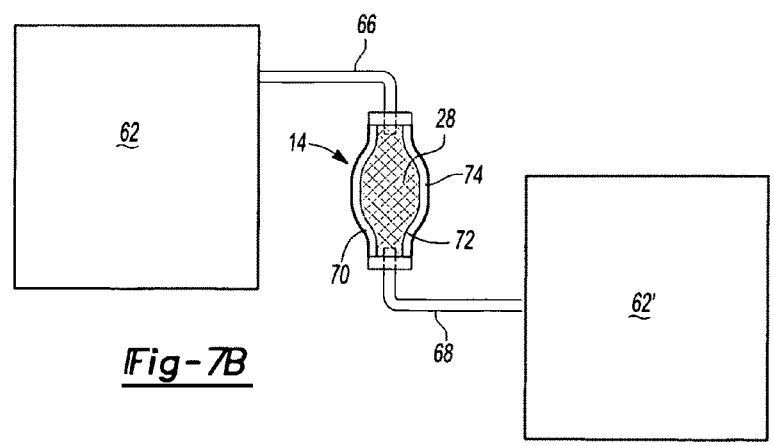

A schematic of one such system 60 is shown in FIGS. 7A and 7B. The system 60 is adapted to be in thermal communication (e.g., by conduction, convection, radiation, or any combination thereof) with a source of heat (which may be waste heat) from at least one primary heat source 62, so that the source heat derived from the primary heat source is transferred to a thermal energy storage material 28, where it is stored (e.g., in one or more suitable containers 64, such as an insulated container) and subsequently reclaimed for heating one or more components. Transfer to the thermal energy storage material may occur using one or more of a suitable first heat throughput device 66 that will transfer heat, by thermal conduction, convection, radiation or any combination thereof. The system optionally may employ one or more of a suitable second heat throughput device 68, for transferring heat from the thermal energy storage material to the primary heat source or a component thereof, or to another item or component 62'.

Figure 8A:
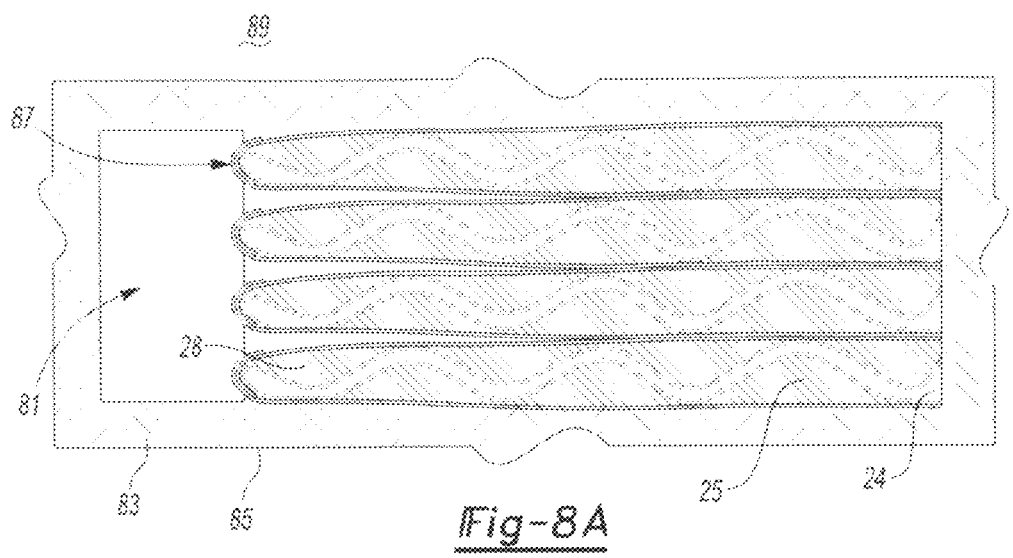
FIG. 8A illustrates an TESM encapsulation structure integrated into a heat exchanger and having a heat source.
Figure 8B:
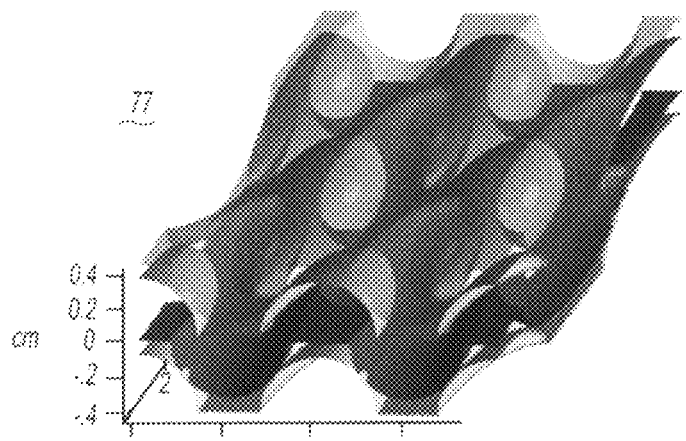
FIG. 8B illustrates a geometry of a stack of capsules.

FIG. 8A, illustrates a heat storage device 89 including an array portion 25 that includes a plurality of capsular structures each filled with TESM 28 for effectively defining a blister pack. As illustrated in FIG. 8A, the heat storage device may be assembled by stacking a plurality of the array portions (e.g., the blister packs) in an opposing and at least partially spaced manner. For example, they are stacked in a nesting and/or in an interdigitating manner. The stacks of blister packs are housed in an insulated container 85. The heat storage device may have a heat source 81 inside the container (preferably having a thermal contact 87 with the blister packs) or a means of transferring heat into and/or out of the container (e.g., one or more heat throughput devices). For example, the array portions 25 of FIG. 8A may be stacked according to the geometry illustrated in FIG. 8B.

Figure 9:
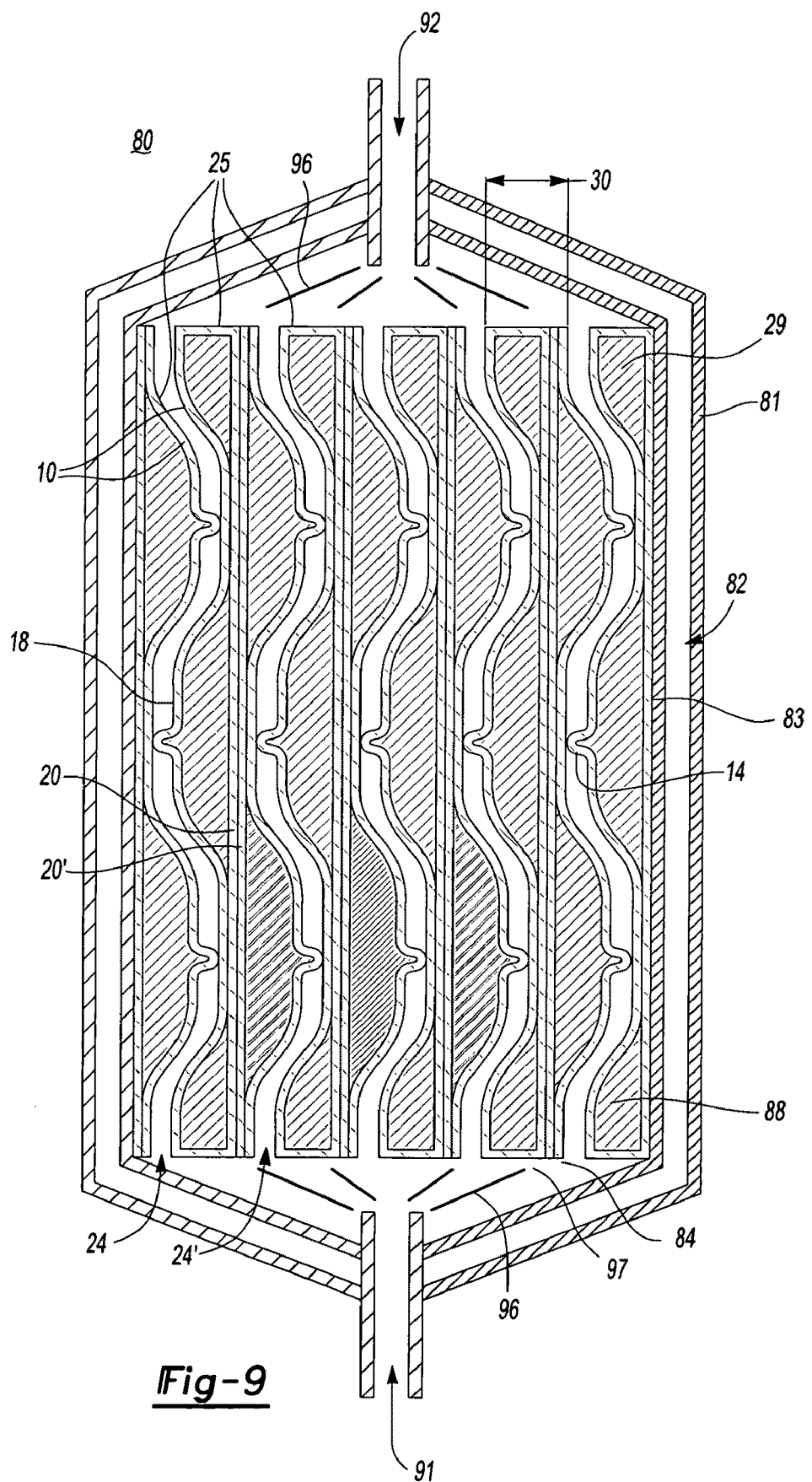
FIG. 9 illustrates a cross-section of a heat storage device in the flow direction.

FIG. 9 illustrates a cross-sectional view of an illustrative thermal energy storage device 80 having a thermal energy storage material 28 encapsulated in blister packs 25. The thermal energy storage device may include a container having an outside wall 81 and defining a housing 83. The housing may form a cavity 84 having an interior volume and the housing may have at least one opening, such as an inlet 91, an outlet 92, or both. For example, a heat transfer 97 fluid may circulate through the housing, entering the housing through the inlet 91 and exiting through the outlet 92 (the arrow in FIG. 9 pointing to the outlet illustrates the location of the outlet and not the direction of flow). The device may also have a means of insulating the housing (e.g. an insulating layer 82 or an evacuated cavity, which at least partially surrounds the housing 83). The insulation 82, may function to reduce the rate of heat loss from the heat storage device. The cavity of the housing 84 may contain may contain blister packs 25 which contain a TESM 28. The blister packs 25 may contain a first ply 10 that is sealed (e.g. welded or diffusion bonded) to a second ply 20 and contains the TESM 28 in a plurality of individually isolated sealed capsules 29. The first ply 10 may also have one or more bumps, nubs or other protrusions which may function as a spacer 14. The cross-section of FIG. 9 is taken in a section containing nubs on the capsules, other sections (e.g., as illustrated in FIG. 3A) are free of nubs. It should be realized that the nubs are preferably small (e.g., in the direction perpendicular to the cross-section) such that the heat transfer fluid can easily flow around the nubs.

Opposing stacked array portions (e.g., a blister pack layer) may be included. The heat storage device may include at least four, preferably at least 6, and more preferably at least 8 array portions. For example, at least one pair of blister packs including a first blister pack and a second blister pack may be arranged such that a surface of the second ply 20 of the first blister pack is in contact with a surface of the second ply 20' of the second blister pack and such that the pair of blister packs forms a layer 30 which may have a generally constant thickness. The pairs of blister packs, each forming a layer, may be stacked such that they form a generally constant gap distance between two adjoining layers. The gaps between the layers define one or more (e.g., a plurality of) flow paths 24. As illustrated in FIG. 9, the heat storage device may include at least two, preferably at least three, and more preferably at least four flow paths.

A heat transfer material 97 (e.g., a heat transfer fluid or other working fluid) may flow through the flow paths 24, and contact a surface of the capsules 16 for providing heat to the TESM 28 or removing heat from the TESM. The blister packs may be arranged such that a first flow path 24 and second flow path 24' generally have the same cross-sectional dimension (e.g., shape, height, width, area, or curvature) transverse to the flow direction and may also have parallel flow paths. The housing may also contain one or more baffles 96 for directing the flow of the heat transfer fluid to each of the flow paths 24. Besides maintaining a predetermined spacing (e.g. a uniform distance) between facing blister packs 25, the spacers 14 may be also be used to split and recombine the flow of the heat transfer fluid, thus decreasing the variation in the temperature of the heat transfer fluid. Heat transfer fluid 97 may remain in the housing 83 at all times or it may be drained from the housing at a time when it is not needed. At the location of the recombination a mixing may occur of the recombined fluids. For example, the device structure may be such that there may effectively be defined a static mixer for mixing a plurality of the fluid streams at such locations.

As can be appreciated from FIG. 9, by using small spacers 14 it may be possible to reduce the distance between adjacent layers of two blister packs 30 and thus increase the concentration (volume %) of the TESM 28 in the housing 83. It may be advantageous to increase the surface area between the capsules 29 and the heat transfer fluid 97 (e.g. by increasing the total surface area of the first plies 10 of all of the blister packs) such that the rate at which heat can be transferred into the TESM or out of the TESM may be increased. The first ply, the second ply or both may also have one or more protrusion (not shown) inside the cavity of the capsule to increase the thermal contact between the TESM and the plies, such that the heat transfer rate may be increased. The orientation of the inlet 91, outlet 92, and flow paths 24, may be in any direction. Preferably, the flow path orientation is such that the flow of a heat transfer fluid from the inlet, through a flow path 24 and out an outlet 92 is a flow in a positive vertical direction (i.e. the outlet is at a location higher than the inlet and the flow path is between the inlet and the outlet).

The size and shape of the plurality of flow paths may chosen to keep the hydraulic resistance of the heat exchanger (e.g., as measured by the pressure drop of the heat transfer fluid) reasonable. The plurality of flow paths are preferably such that a heat transfer fluid flowing at a total rate of about 10 liter/minute through the heat storage device has a difference in pressure between the inlet and the outlet preferably less than about 3 kPa, more preferably less than about 2.5 kPa, even more preferably less than about 2.0 kPa and most preferably less than about 1.5 kPa. By way of example, but without limitation, the plural (first and second, here) flow paths illustrated in FIG. 9 are generally parallel and each have about the same cross-sectional area. Preferably the flow rate through a first flow path and the flow rate through a second flow path are about the same. For example the ratio of the two flow rates may be from about 2:3 to about 3:2.

The container for containing the thermal energy storage material preferably is an (thermally) insulated container, such that it is insulated on one or more surfaces. Preferably, some or all surfaces that are exposed to ambient or exterior will have an adjoining insulator. The insulating material may function by reducing the convection heat loss, reducing the radiant heat loss, reducing the conductive heat loss, or any combination. Preferably, the insulation may be through the use of an insulator material or structure that preferably has relatively low thermal conduction. Referring again to FIGS. 7A and 7B, the insulation may be obtained through the use of a gap 70 between opposing spaced walls 72 and 74 of the container 64, which contains the thermal energy storage material 28. The gap may be occupied by a gaseous medium, such as an air space, or possibly may even be an evacuated space (e.g., by use of a Dewar vessel), a material or structure having low thermal conductivity, a material or structure having low heat emissivity, a material or structure having low convection, or any combination thereof. The container may contain ceramic insulation (such as quartz or glass insulation), polymeric insulation, or any combination thereof. The insulation may be in a fibrous form, a foam form, a densified layer, a coating or any combination thereof. The insulation may be in the form of a woven material, an unwoven material, or a combination thereof. The container may include one or more metal layers or surfaces (e.g., in the form of a sheet, a plate, a foil, a plating, a wire, a rod, a mesh screen, or any combination thereof. Any of the insulation layers or surfaces may include or be free of any perforations, fins, or other surface configuration for increasing or decreasing available surface area of the structure. As discussed above and as illustrated in FIGS. 7A and 7B, one preferred (thermally) insulated container includes a Dewar vessel, and more specifically a vessel that includes generally opposing walls configured for defining an internal storage cavity, and a wall cavity between the opposing walls, which wall cavity is evacuated below atmospheric pressure. The walls may further utilize a reflective surface coating (e.g., a mirror surface) to minimize radiant heat losses.

The insulated container may include one or more valves for controlling pressure within internal storage cavity. A valve may also be employed for controlling pressure in the wall cavity. Other conduits, flow regulators, pumps, vents or other components may be employed as desired to help control fluid circulation within the system.

The container desirably is capable of functioning at any temperature between the minimum operating storage temperature and the maximum operating storage temperature. For example, in a transportation vehicle, the minimum operating storage temperature would be the lowest ambient conditions the vehicle is reasonably expected to experience in service (e.g., about −40° C., or possibly even −60° C. or colder) and the maximum operating storage temperature is the highest temperature that the thermal energy storage material is contemplated to be heated (e.g., due to the normal conditions encountered in vehicle operations; for example, an engine block of an automotive vehicle from which heat is obtained in one embodiment herein may be expected to reach a temperature on the order of about 300° C.).

Referring again to FIGS. 7A and 7B, the system herein preferably may include one or more heat throughput devices 66 or 68 for transferring thermal energy to the storage container, from the storage container, or both. For example, the one or more structures may be configured for transferring heat from a heat source to the thermal energy storage material, for transferring heat to the heat source from the thermal energy storage material, for transferring heat from the thermal energy storage material to a component other than the heat source for which heating is desired, or any combination thereof. In a preferred embodiment, the heat throughput device includes a heat throughput mechanism selected from a heat pipe (which optionally may be a flat heat pipe, a tubular heat pipe or a combination thereof), a thermosiphon, a fluid (e.g., gas or liquid) circulation loop, a metal contact (e.g. a metal contact containing a metal having high thermal conductivity, such as copper), or any combinations thereof. It will be appreciated that for preferred heat pipes the mechanism will operate by the vaporization of a working fluid at the end providing heat and the condensation of the working fluid on the end which is being heated. The transfer of the working fluid can be either by a wick structure which exerts a capillary force on the liquid phase of the working fluid or by gravity. Such a heat pipe is a sealed system where the vapor is composed substantially of (or consist essentially of) vapors from the working fluid. On the internal side of the tube's side-walls a wick structure exerts a capillary force on the liquid phase of the working fluid.

By way of example, one heat throughput device may include a refrigerant or coolant loop (e.g. the circulation of a refrigerant or coolant such as glycol between the primary heat source and the thermal energy storage material). It is also possible that the TESM may be circulated through a loop. Any art known means for transferring thermal energy to the thermal energy storage material may be used. The insulated container for storing the thermal energy storage material may form part of the heat throughput mechanism. For example, the insulated container may comprise channels for a circulating liquid. The insulated container may also include features (such as fins protruding from the interior walls of the container towards the cavity formed by the container) to increase the rate at which heat can be transferred to the thermal energy storage material. The heat throughput device may include one or more devices for increasing the rate of heat transfer, such as a pump, a fan or blower, or otherwise.

The means for transferring heat to the TESM may be the same or different from the means for removing heat from the TESM (e.g., the heat storage device may described as including a two-way heat exchanger, a two-chamber heat exchanger, a three-way heat exchanger, or a three-chamber heat exchanger). Any of the heat throughput devices described herein may be used for transferring heat to the TESM or removing heat from the TESM. The heat source for heating the TESM may also be inside an insulated container which contains the TESM. For example an electric heater may be inside the insulated container and the means of heating the TESM may be a thermal connectivity between the TESM and the heater. The means for removing heat from the TESM may, for example, include a step of directly heating the object which is desired to be heated (e.g., air may be circulated through the insulated container and heated by the TESM, thus removing heat and transferring it the air, which is then provided as warm air such as to a building or a passenger compartment of a vehicle).

The heat storage system may be integrated into another component through which the primary heat source passes. As an example, the exhaust from a transportation vehicle may pass through a catalytic converter. In such a primary heat source, the downstream portion of the catalytic converter may be adapted to function as part of the heat storage system. For example a heat throughput device for transferring thermal energy to the thermal energy storage material may include a component which connects a portion of the catalytic converter to the insulated container. If the heat storage system is integrated with a catalytic converter, it preferably is located after the catalytic converter.

In one respect, the present invention achieves an unexpected result by its ability to provide a sub-system in an apparatus that occupies relatively little volume in the apparatus, that can be packaged to fit within the existing confines of the apparatus, and which contributes little increase in overall weight to the apparatus. Accordingly, a preferred system of the present invention accomplishes the above-mentioned performance, while surprisingly contributing less than about 5%, more preferably less than about 3%, and still more preferably less than about 1% of the overall weight of the system in which it is employed. For example, it may be possible to employ a system of the present invention in an automotive vehicle, by using less than about 20 kg, and more preferably less than about 10 kg of the thermal energy storage material.

The heat storage system may also include one or more control systems to control the heat transfer between the primary heat source and the insulated container, a control system to control the heat transfer between the insulated container and the object to be heated, or both. Exemplary control systems are described in U.S. Patent Application Nos. 61/061,908 filed on Jun. 16, 2008, 61/074,840 filed on Jun. 23, 2008, and 61/090,084 filed on Aug. 19, 2008, incorporated herein by reference.

The heat storage system may be a module, such as the modules disclosed U.S. Patent Application Nos. 61/061,908 filed on Jun. 16, 2008, 61/074,840 filed on Jun. 23, 2008, incorporated herein by reference. For example, the heat storage system may be a module that includes an electrical heater (e.g., a resistive heater).

The heat storage device may contain any total amount of TESM. By way of illustration, for certain automotive vehicle applications it may be desirable for the quantity (i.e., volume) of the TESM in the heat storage device (or in all of the heat storage devices of the vehicle component) to be greater than about 1 liters, preferably greater than about 3 liters, more preferably greater than about 5 liters, and most preferably greater than about 8 liters. The quantity of the TESM in the heat storage device (or in all of the heat storage devices of the vehicle component) may be less than about 25 liters, less than about 20 liters, less than about 17 liters, and less than about 14 liters). Other volumes are also possible. Such a heat storage device(s) may be capable of releasing a substantial amount of heat upon cooling the TESM from 300° C. to about 80° C. The heat storage device may release greater than about 1 MJ, preferably greater than about 2 MJ, more preferably greater than about 4 MJ, most preferably greater than about 6 MJ (or even greater than about 10 MJ) of heat when the TESM is cooled from about 300° C. to about 80° C.

Heating systems (e.g., heat storage systems), heating modules, heating components and heat storage process and heating processes which may use the heat storage device or the blister packs described herein are further described in U.S. Patent Application No. 61/030,755 filed on Feb. 22, 2008, U.S. Patent Application No. 61/061,908 filed on Jun. 16, 2008, U.S. Patent Application No. 61/074,799 filed on Jun. 23, 2008, U.S. Patent Application No. 61/074,840 filed on Jun. 23, 2008, U.S. Patent Application No. 61/074,869 filed on Jun. 23, 2008, U.S. Patent Application No. 61/074,889 filed on Jun. 23, 2008, and U.S. Patent Application No. 61/090,084 filed on Aug. 19, 2008, all incorporated herein by reference in their entirety.

The TESM material in the heat storage device (e.g., encapsulated in the capsular structures) may be any suitable TESM. Examples of TESM materials are described in U.S. Patent Application Nos. 61/030,755 filed on Feb. 22, 2008, 61/061,908 filed on Jun. 16, 2008, 61/074,869 filed on Jun. 23, 2008, and U.S. patent application Ser. No. 12/389,416 entitled "THERMAL ENERGY STORAGE MATERIALS" filed on Feb. 20, 2009. For example, the thermal energy storage material may comprise at least one first metal containing material, have a liquidus temperature from about 85° C. to about 350° C., undergoes at least one phase transition, exhibits either or both of i) the heat of fusion density is at least about 1 MJ/l; or ii) the heat storage density from 300° C. to 80° C. is at least about 1 MJ/l. The TESM may be characterized by a heat storage density from 300° C. to 80° C. (measured by differential scanning calorimetry using an instrument calibrated for heat capacity, at a cooling rate of 10° C./min and defined as the integral of the heat flow rate over the temperature range of 300° C. to 80° C.) greater than about 1 MJ/liter, preferably greater than about 1.2 MJ/liter, more preferably greater than about 1.4 MJ/liter. Suitable TESMs may have a liquidus temperature greater than about 20° C., preferably greater than about 85° C., more preferably greater than about 85° C., even more preferably greater than about 95° C., and most preferably greater than about 100° C. (e.g., greater than about 125° C.). The TESM may have a liquidus temperature less than about 700° C., preferably less than about 300° C., more preferably less than about 280° C., even more preferably less than about 250° C., and most preferably less than about 200° C. The TESM may have a heat of fusion density greater than about 0.5 MJ/liter, preferably greater than about 0.7 MJ/liter, more preferably greater than about 1.0 MJ/liter, most preferably greater 1.2 MJ/liter. The TESM may have a hydrogen concentration less than about 5 mole % based on the total moles of atoms in the TESM, a concentration of water less than about 5 wt. % based on the total weight of the TESM, or both. The TESM may include a salt including a nitrate, a nitrite, or any combination thereof. The TESM may include a lithium cations, potassium cations, sodium cations, or any combination thereof. The TESM may include lithium cations at a concentration from about 20% to about 80 mole %, preferably from about 30% to about 70% based on the total moles of cations in the TESM. The TESM may include lithium nitrate at a concentration from about 20 mole % to about 80 mole % lithium nitrate, based on the total moles of salt in the TESM. The TESM may includes from about 30 mole % to about 70 mole % lithium nitrate and from about 30 mole % to about 70 mole % sodium nitrate. The TESM may include lithium nitrate and sodium nitrate at a total concentration greater than 90 wt. % (e.g., greater than about 95 wt. %) based on the total weight of the TESM. The TESM may include at least one first metal compound that includes a nitrate ion, a nitrite ion, or both; at least one second metal containing material including at least one second metal compound; and optionally including water, wherein the water concentration if any is present is less than about 10 wt %. The TESM may be an eutectic composition including lithium nitrate, sodium nitrate, lithium nitrite, sodium nitrite, or any combination thereof.

The TESMs, capsular structures containing them, the sub-assemblies and modules described herein may be used singularly or in plural to store and discharge heat in any of a number of applications. In one general sense, they may be used in a process of reclaiming heat which includes the steps of: a) transferring at least a portion of a source heat from a heat source; b) heating the thermal energy storage material using the source heat; c) increasing the amount of the liquid phase in the thermal energy storage material by converting at least a portion of the source heat into latent heat; d) maintaining the amount of the liquid phase in the thermal energy storage material to store the latent heat; e) converting at least a portion of the latent heat into released heat; and f) transferring the released heat to an item to be heated.

The steps of this process of reclaiming heat may be repeated reliably and efficiently in many cycles (e.g., more than one hundred times, more preferably more than one thousand or even five thousand times). It should be realized that it is not necessary that the steps be followed in the exact sequence listed above in every cycle. For example, the steps of increasing the concentration of the liquid phase and of maintaining the concentration of the liquid phase may be repeated many times before the step of reducing the concentration of the liquid phase.

The teachings of the present invention find particularly attractive utility in applications demanding rigorous performance requirements. Among the many applications for which the above process may be employed are heating applications for transportation vehicles, for buildings, for fluid heating, for power generation, for chemical reactions, for reclaiming waste heat from an industrial application, and others.

For example, the invention may advantageously be used for heating applications that include steps of discharging heat from the TESM to a heat transfer fluid at a high initial rate (i.e., a high initial power). The initial power of the heat storage device per volume of the heat storage device housing (i.e., the power density of the heat storage device) may be greater than about 8 kW/L, preferably greater than about 10 kW/L, more preferably greater than about 14 kW/L, and most preferably greater than about 1 kW/L (e.g., greater than about 20 kW/L), and is measured using a heat storage device having TESM at an initial temperature of 280° C. and the heat transfer fluid has an initial temperature of about 10° C. (and preferably the heat transfer fluid has a flow rate of about 5 liter/min per liter of housing).

The invention may advantageously be used for heating applications that include steps of storing heat for a prolonged period of time (e.g., longer than four hours, more preferably longer than 12 hours, still more preferably longer than 1 day, still more preferably longer than 2 days, and for certain heat storages systems even longer than about 30 days), without substantial loss of heat to ambient, so that when the stored heat is desired to be used it is available for such use In one embodiment of the invention, an amount (e.g., greater than about 0.5 kg) of the thermal energy storage material in the heat storage system is contemplated to perform sufficiently so that it may be heated to a temperature of about 300° C. and then the ambient air around the outside of the container is reduced to about −60° C. for a time period of about 6 hours, more preferably about 12 hours, still more preferably about 24 hours, even still more preferably about 48 hours, and yet even still more preferably about 72 hours (or possibly even 96 hours or more) without transferring additional heat into the thermal energy storage material. Under such conditions, the insulation and structure of the container is sufficient to maintain the temperature of the thermal energy storage material to at least about 80° C., and preferably at least about 100° C. throughout the ambient exposure time period.

The invention may advantageously be used for heating applications that includes a step of releasing greater than about 2000 kJ, more preferably greater than about 3000 kJ and most preferably greater than about 4000 kJ (e.g. greater than about 6,000 kJ) when the thermal energy storage material is cooled from (e.g., from 300° C. to 80° C.). By way of example, one such application may employ a volume of TESM less than about 6 liters, more preferably less than about 3 liters, even more preferably less than about 2.5 liters, and most preferably less than about 2 liters.

The invention may advantageously be used for heating applications that include a step of heating input air from about 0° C. to about 30° C. at a rate of about 12 liters/second for a time of at least about 30 minutes, more preferably at least 60 minutes, still more preferably at least 120 minutes, and most preferably at least about 240 minutes without simultaneously applying any external heat supply to any TESM, sub-assembly or module (e.g., without supplying an electric current to an electric heater to heat TESM).

The invention may advantageously be used for heating applications that include step of cooling TESM of a system from about 300° C. to about 80° C., so that the system releases a sufficient amount of heat to: a) maintain the fluid containing part at a temperature greater than about 20° C. (preferably greater than about 30° C., more preferably greater than about 50° C., and most preferably greater than about 65° C.) for a time of at least about 2 hours (preferably at least about 4 hours, more preferably at least about 6 hours, and most preferably at least about 8 hours) when the ambient temperature is less than about −10° C.; b) maintain the fluid containing part to a temperature greater than about 10° C. (preferably greater than about 15° C., more preferably greater than about 17° C.) for a time of at least 2 hours (preferably at least 4 hours, more preferably at least 6 hours) when the ambient temperature is less than about −10° C.; or c) both (a) and (b).

The invention may advantageously be used for heating applications that include steps of thermal cycling encapsulated TESM between a temperature of about 10° C. and about 300° C. repeatedly over a duration of at least 4 years (and more preferably at least 6 years) and the system will be resistant to corrosive attack at about 300° C. from the TESM, resistant to fatigue failure from thermal cycling between about 10° C. and about 300° C., or both, such that less than 10% of the TESM is lost from the blister packs as a result of the cycling. In this regard, the invention may advantageously be used for heating applications that include steps resisting environmental damage (e.g. salt spray), thermal cycling, and impact (e.g. stone chips), so that it may be used in applications requiring a useful operating life of at least four years, and more preferably at least 6 years.

For example, various aspects of the invention may be used in heating applications such as vehicle applications such as i) cold start heating (e.g., less than 10 minutes prior to a start, during a start, or less than 5 minutes after a start) of an engine (e.g., using a heat transfer fluid), a passenger compartment, a window, or any combination thereof; ii) heating of a passenger compartment, a window, or both on a plug-in electric vehicle, a plug-in hybrid electric vehicle (i.e., a PHEV), or a hybrid vehicle (HEV) using electricity from an electric grid; iii) providing multiple heating locations for more efficient and targeted heating (localized or satellite heating); iv) heating an engine block, engine oil, a passenger compartment, or any combination thereof while the vehicle is in an engine-off mode; v) heating a battery in an electric vehicle, a PHEV, or an HEV; vi) heating a transmission or transmission oil; vii) heating a wiper fluid or some other working fluid; viii) heating a catalyst; or any combination thereof. The invention may be used for heating components such as an internal combustion engine, a transmission, a catalytic converter, a cockpit (e.g., an air stream for heating a cockpit), a passenger seat, a window or windshield, or a circulating fluid (e.g., a liquid or gas) for providing heat to any of the above components. The invention may be used to heat one, two, three, four or any combination of these vehicle components. The invention may be used for storing heat generated by a vehicle component such as from an engine block, a fluid circulation system, an intercooler, a radiator (e.g., air or liquid), a turbocharger, a compressor for an air conditioning unit, engine oil, a transmission, transmission fluid, an exhaust manifold, an exhaust pipe, a catalytic converter, an exhaust tip, a heat shield, mounting hardware, a muffler, a braking component, a shock absorber, or an electric resistance heater. In one preferred aspect, the systems herein may be used in a transportation vehicle application that includes a step of i) heating an internal combustion engine or a circulating fluid for heating a combustion engine from a temperature of less than 5° C. to a temperature of at least 60° C. in a time of less than 60 seconds; ii) heating an air stream for heating a cockpit from a temperature of less than 5° C. to a temperature of at least 40° C. in a time of less than 60 seconds; or both (i) and (ii).

Figure 12:
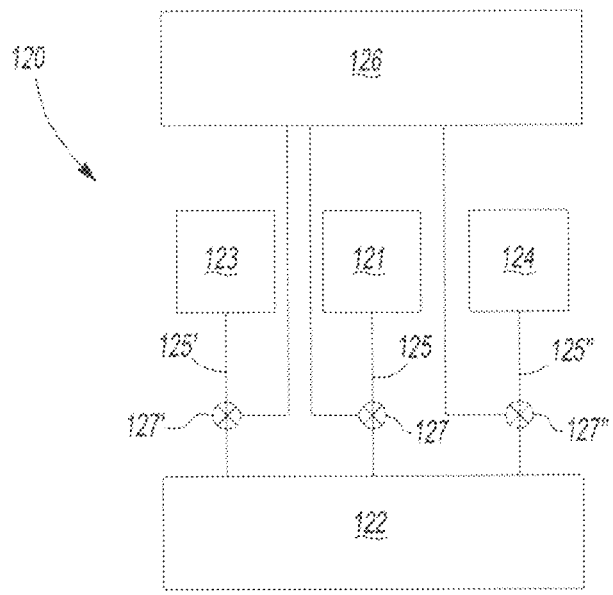
FIG. 12 illustrates a vehicle component having a heat storage device which may be used to heat both a fluid containing part and an air stream.

To help further illustrate the use of the teachings herein in a transportation vehicle, reference may be made to systems illustrated in FIGS. 10-12. FIG. 10 illustrates a vehicle component 111 according to the teachings of the invention herein which may be used to heat both a fluid containing part 103 and a heat storage device 104 on a vehicle 101. The heat may be generated by a heater (e.g., an electric heater) 102. The vehicle component 111 may also contain a means for transferring heat 107 from the heater 102 to the fluid containing part 103 and a means for transferring heat 107' from the heater 102 to the heat storage device 104. The vehicle component may also comprise a fluid stream (e.g., an air stream which blows air into a cockpit, or onto a window) 105 and a means for transferring heat 107" from the heat storage device to the air stream. The vehicle component may also include a controller (e.g., a temperature control) 106 to control the flow of electricity to the heater (and optionally to control the heat flow from the heater to the heat storage device and the fluid containing part). The vehicle component may also contain a plug 110 or other means for connecting the heater to a source of electricity 109 which is outside 100 of the vehicle. When connected, there may be an electrical path 108 between the heater 102 and the source of electricity 109.

FIG. 11 illustrates another vehicle component 115 according to the teachings of the invention herein which may be used to heat both a fluid containing part 103 and a heat storage device 104 located in a vehicle 101. The heat may be generated by a first heater (e.g., an electric heater) 102 which may be located inside the fluid containing part (or in thermal contact with the fluid containing part or have a means of transferring heat to the fluid containing part) The vehicle component 115 may also contain a means for transferring heat 107' from a second heater (e.g., a second electrical heater) 102' to the heat storage device 104. The vehicle component may also comprise an air stream (e.g., an air stream which blows air into a cockpit, or onto a window) 105 and a means for transferring heat 107" from the heat storage device to the air stream. The vehicle component may also include a controller (e.g., a temperature control) 106 to control the flow of electricity to one or both of the heaters (and optionally to control the heat flow from the second heater to the heat storage device. The vehicle component may also contain a plug 110 or other means for connecting the heater to a source of electricity 109 which is outside 100 of the vehicle. When connected, there may be an electrical path 108 between the heaters 102 and the source of electricity 109.

FIG. 12 illustrates another vehicle component 120 according to the teachings of the invention herein which may be used to heat both a fluid containing part 123 and an air stream 124 using heat that is stored in a heat storage device 122 (or possibly from a plurality of heat storage devices). The vehicle component may include an exhaust system 121, which may provide the heat for heating the heat storage device. The vehicle component may also contain a means for transferring heat from the exhaust system to the heat storage device 125, a means for transferring heat from the heat storage device to the air stream 125", and a means for transferring heat from the heat storage device to the fluid containing part 125'. The vehicle component may also include a controller (e.g., a temperature control) 126 to control the various heat flows (e.g., to ensure that the heat storage device, the fluid containing part, and the air stream do not overheat). The temperature controller may have one or more means of regulating 127, 127', 127" the heat transfer into and out of the heat storage device.

Additional applications which may use the heat storage device disclosed herein include: heating the air in a building or water (e.g., heating in the winter using solar energy collected in the summer); heating a building with a furnace having improved efficiency; heating non-automotive battery cells; heating an electrochemical battery; and heating of floors using a solar hydronic system, an electric system or both. Additional examples of objects that may be heated include a fluid vessel (e.g., the water in a hot water tank), a circulating fluid (e.g., an air stream or a liquid) for heating a building, a cooking device, a turbine, a hot plate, a laundry dryer (i.e., a tumble dryer), a heat engine (e.g., a Rankine or Brayton Cycle) to generate electric power or to power a compressor of an air conditioning unit, and a working fluid of an absorption or adsorption cycle air conditioning system. Additional heat sources thus may include heat generated by one or more of: the sun, a lawn mower motor, a motor for a snow removal device, a conveyer (e.g., an escalator, an elevator, or a conveyor belt), an oven, a home appliance, paving equipment, a watercraft motor, a solar heat collector, an exhaust stack, a non-automotive braking system, a resistance heater, a chemical reactor, a condenser unit of an air conditioning system and a geothermal circulating fluid.

Larger scale structures are also possible using the present teachings, and may employ proportionately larger structural dimensions and volumes of TESM as compared with the present teachings.

The following discussion applies to the teachings as a whole. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. References to an The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Example 1

Forming a Blister Pack

Figure 13:
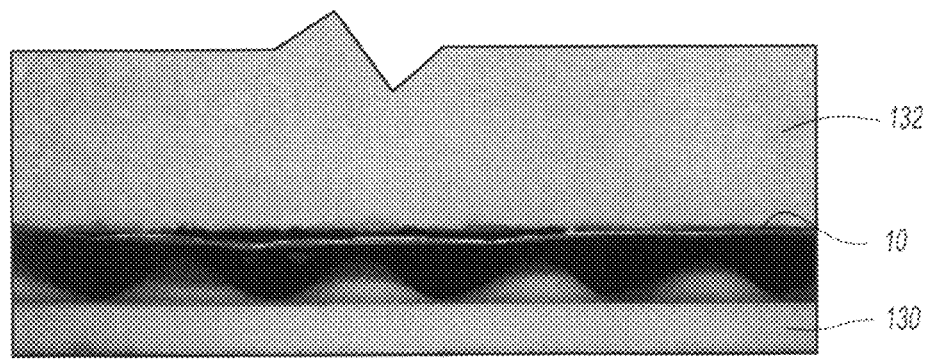
FIG. 13 illustrates an example of tooling which may be used to form an embossed ply.

A first foil of an aluminum alloy (1100) having a thickness of about 0.07 mm is embossed to form a first ply. The embossing process, as illustrated in FIG. 13, may be performed using an embossing tool having a male portion 130 and a female portion 132, wherein the foil 10 is placed in-between the two portions. A force is then applied to press the two portions of the mold together. The male portion of the tool is made of a rigid and hard material (e.g., a hardened epoxy) that yields a durable tool so as to withstand the forming process. The female portion of the tool is made up of a resilient material (e.g., a foam such as a 50 mm thick closed cell foam sold under the tradename of Ethafoam™). When the press is closed and the foil is pushed by the foam and forms into the male tool portion of the tool. Wrinkling may be controlled by placing a block around the edges of the tooling. A force of about 66,000 N is used to form the first ply which contains about 30 troughs (e.g. pouches) where each of the troughs has a volume of about 1 ml. Each trough is surrounded by a lip region which separates the troughs. During the embossing process, bumps are also formed at the bottom of the troughs.

These bumps are projections from the bottom surface of the first ply which are lower than the remaining bottom surface of the first ply.

The troughs are filled with a TESM having a liquidus temperature from about 85° C. to about 350° C. The TESM is melted prior to filling the troughs. Similar results are expected if the TESM is provided in a solid state and thereafter is heated to become flowable to within a trough.

A second ply of the aluminum alloy (1100) is then placed on top of the first ply. The second ply is generally planar and has a surface area large enough to completely cover the TESM filled troughs of the embossed first ply.

The facing surfaces of the first and second plies are diffusion bonded to form a blister pack having individually isolated (i.e. sealed) capsules, in this instance 30 capsules. The two previously arranged plies are placed in a cradle which has a similar size and shape as the first ply such that the first ply is supported on the bottom surface of the first ply below the lips which surround the troughs of the first ply. The cradle is used to assure that pressure is only applied in the lip region of the first ply and not to the TESM in the troughs. The cradle may be necessary because pressing may be desired only in the areas between the filled capsules. The diffusion bond is performed in a heated press. The diffusion bonding is performed at a temperature of about 350° C. and a force of about 22,000 N on the plies to form 30 capsules each having a volume of about 1 ml. The diffusion bonding is performed for about 5 minutes to assure each capsule is completely sealed, but shorter times or even a continuous process may be used.

The process is then repeated to form additional blister packs. The blister packs are arranged in pairs with their second plies facing each other and oriented such that the troughs of one blister pack is centered above a lip of the second blister pack. Each pair of blister packs forms a layer having a fairly uniform thickness. The layers are then stacked such that the top surface of the first layer is arranged to mate with the bottom surface of the second layer. Thus arranged, flow paths for a heat transfer fluid are formed between each pair of layers. A structure of five layers each containing a pair of blister packs is formed. A representative arrangement is illustrated in FIG. 3A, using blister packs 25 having one arcuate surface and one flat surface. The arcuate surfaces of two adjacent blister packs define a flow path 24 for a heat transfer fluid. In this illustrative example, arcuate surfaces may be generally parallel spaced walls, which in this example define a flow path which is generally sinusoidal. A flow path may have any may any shape and curvature. The flow path may be flat or linear, it may also have a combination of one or more linear sections and one or more arcuate (e.g., sinusoidal) sections. The concentration of the thermal energy storage material in the structure defined by the five layers is greater than about 80 volume %.

Figure 14:
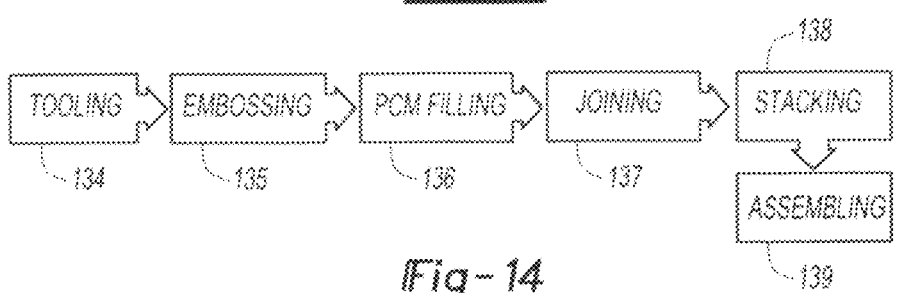
FIG. 14 illustrates a process for preparing a heat storage device using a TESM which is encapsulated into blister packs.

The steps of this process are further illustrated in FIG. 14. A tooling may be provided 134 having the desired pattern for a first ply to be used in the blister packs. The process may have a step of embossing 134 a foil to form a first ply (e.g., forming troughs in the first ply). The process may also have a step of filling 136 the first ply (e.g., filling troughs formed in the first ply) with a TESM (e.g., a phase change material). for creating the capsules. The process may include a step of joining 137 or otherwise sealing the first ply to a second ply. This step 137 may result in the formation of a blister pack. The process may include a step of stacking 138 blister packs (or possibly folding or winding one or more blister packs). The process may also include a step of assembling a heat storage device including a step of inserting 139 a stack of blister packs into the cavity of a container (or the blister packs may be stacked in the cavity, or the container may be formed around the stack of blister packs).

Example 2

Blister packs are prepared by placing about 2 g of TESM containing equimolar concentrations of lithium nitrate and sodium nitrate into each of the 30 troughs of a first ply. The first ply is placed in a fixture in a press heated to a temperature of about 350° C. (e.g., at a temperature greater than about 100° C. over the liquidus temperature of the TESM). The fixture contacts and supports the first ply in the lip area of the first ply and the trough regions are in a cavity of the fixture and generally do not contact the fixture. The TESM melts within about 5 minute and fills the troughs (e.g., at least about 95% filled). The TESM containing first ply is heated for at least about 15 minutes. Any water in the TESM is removed under these conditions, such that the TESM is substantially free of water. A flat cover ply (i.e. the second ply) is then placed over the first ply. A relatively low force of less than about 3,000 lbs is applied to remove any molten TESM from the lip regions. The force is then slowly increased to about 64,000 lbs. The first and second plies are joined to form 30 individually isolated, air-tight capsules, each containing about 2 g of TESM.

A heat storage device is prepared using a stack of 8 of the thus formed blister packs, each containing 30 individually isolated capsules (i.e., a total of 240 capsule) and stacked in pairs to provide 4 flow paths each having a thickness of about 2 mm. The total weight of the TESM is about 0.485 kg (i.e., each capsule contains about 2 g of the TESM. The blister packs are placed inside the housing of an insulated container having an inlet and an outlet. The housing of the heat storage device has a total volume about 0.73 liters which is filled with the blister packs and the flow paths for a heat transfer fluid. The blister packs are heated to about 280° C. using forced hot air. Then water having an initial temperature of about 4.4° C. is fed through the gaps of the heat storage device at a flow rate of about 7.8 liters/minute for a time of about 30 seconds. The discharged water is collected and has an average temperature of about 32.8° C. The heat removed from the heat storage device is thus calculated to be about 0.444 MJ. The average initial power density of the heat storage device (averaged over the initial 30 seconds), including the TESM, is about 21 kW/L based on the interior volume of the housing of the insulated container.

Example 3

A heat storage device is prepared by first encapsulating a TESM sample containing 50 mole % sodium nitrate and 50 mole % lithium nitrate between two thin, flat, parallel metal foils to form a three layered sheet containing the TESM sandwiched between the foils. The TESM fills the entire space between the two metal foils. The sheet is placed in the housing of an insulated container and heated to about 280° C. (above the liquidus temperature of the TESM). At 280° C., the thickness of the TESM in the sheet is about 4 mm and two channels for flowing coolant (over each of the two flat surfaces of the sheet) each have a constant thickness of about 0.65 mm. The housing contains only the two channels and the sheet and has a predetermined volume. The TESM occupies about 75% of the volume of the housing. Coolant having an initial temperature of about 50° C. flows through the container at a constant flow rate for 30 seconds. The average initial power density of the heat storage device over the 30 seconds is expected to be about 30 kW/liter based on the interior volume of the housing. An attempt to reproduce this is made substituting paraffin (having a melting temperature of about 65° C.) for the TESM for comparison purposes. It cannot be duplicated exactly. Modifications in the operating conditions are needed to prevent degradation of the wax. As a result, the average initial power density of the wax containing heat storage device (Example 4) over the 30 seconds is expected to be only about 5.8 kW/liter based on the interior volume of the housing.

Examples 5-7

A sample of metal foil having a thickness of about 20 to 100 μm and a total surface area of about 60 cm² is weighed and then placed in a crucible. The crucible is filled with a heat storage material containing 50 mole % sodium nitrate and 50 mole % lithium nitrate such that the TESM contacts the entire surface of the metal foil. The crucible is sealed and placed in an autoclave at about 300° C. for 45 days. After 45 days, the crucible is cooled to room temperature and the weight change of the metal foil is determined. The test is repeated using two specimens of each metal. Example 5 is an aluminum foil (Al 1100) having an initial thickness of about 75 μm thick. After 45 days in the autoclave the aluminum has an average weight gain of about 8.7 mg. Example 6 is a stainless steel (304 type) having an initial thickness of about 125 μm. After 45 days in the autoclave the 304 stainless steel has an average weight gain of about 0.55 mg. Example 7 is a stainless steel (316 type) having an initial thickness of about 125 μm. After 45 days in the autoclave the 316 stainless steel has an average weight gain of about 0.45 mg.

| Sample Name | Foil Material | Duration (Days) | Initial Weight (g) | Final Weight (g) | Weight Gain (mg) |
| --- | --- | --- | --- | --- | --- |
| EX. 5 | Al1100 | 45 | 0.6159 | 0.6253 | 9.4 |
| EX. 5 | Al1100 | 45 | 0.5710 | 0.5790 | 8.0 |
| EX. 6 | SS304 | 45 | 2.9059 | 2.9064 | 0.5 |
| EX. 6 | SS304 | 45 | 2.8621 | 2.8627 | 0,6 |
| EX. 7 | SS316 | 45 | 3.0077 | 3.0081 | 0.4 |
| EX. 7 | SS316 | 45 | 2.9542 | 2.9547 | 0.5 |

What is claimed is:

1. The device for storing and discharging heat including a housing having an internal volume, an array of capsules within the housing, and a thermal energy storage material contained in the capsules, wherein the device exhibits an average initial power density of heat transferred to a heat transfer fluid of at least 8 kW/L based on the internal volume of the housing wherein the average initial power density is defined over an initial 30 seconds, wherein the average initial power density is measured on the device having an initial temperature of 280° C. in the housing, and the heat transfer fluid having an initial temperature of 10° C.; wherein the thermal energy storage material is encapsulated between two metal plies, the metal plies have a thickness on the order of $10^{-1}$ to $10^2$ μm, the capsules have a thickness from 0.5 mm to 20 mm, the volume fraction of the thermal energy storage material in the housing is 0.5 or more, the housing includes an inlet and an outlet and one or more flow paths for flowing a heat transfer fluid through the housing, and wherein the one or more flow paths and the array of capsules are arranged so that the device has the required average initial power density.

2. The device of claim 1 comprising:
i) an array of capsules within the housing; the array of capsules including
   a) at least one first array portion that includes at least two opposing plies that are joined in contact with each other over a portion of their respective facing surfaces for defining a first capsular structure including a plurality of capsules containing a thermal energy storage material and having a predetermined volume; and
   b) at least one second array portion that includes at least two opposing plies that are joined in contact with each other over a portion of their respective facing surfaces for defining a second capsular structure including a plurality of capsules containing a thermal energy storage material and having a predetermined volume; and
ii) a flow path defined by the volume between the first array portion and the second array portion;
wherein the first array portion and the second array portion are separated by a gap thickness, $t_{gap}$, less than 20 mm; and
the device comprises a plurality of flow paths wherein each flow path is generally nonplanar.

3. The device of claim 2 wherein the thermal energy storage material fills 70% or more of the internal volume of the housing.

4. A device of claim 2, wherein the first array portion and the second array portion are separated by a gap thickness, $t_{gap}$, less than 5 mm.

5. The device of claim 4, wherein the heat storage device includes at least thirty individually isolated sealed capsules.

6. The device of claim 4, wherein the at least one first array portion includes a first array portion that is formed by joining a first ply and a second ply using a method selected from fusion bonding, laser welding, friction welding, or any combination thereof.

7. The device of claim 4 wherein the at least one first array portion includes a first array portion and the at least one second array portion includes a second array portion and wherein the first array portion includes a plurality of nubs for spacing the first array portion and the second array portion.

8. The device of claim 4, wherein the at least one first array portion includes a first array portion and the at least one second array portion includes a second array portion, wherein the second array portion nests into the first array portion such that the first and second array portions are in contact over an area of at least 25% of their facing surfaces.

9. The device of claim 4, wherein the at least one first array portion includes a first array portion, and the at least one second array portion includes a second array portion, wherein the first array portion and the second array portion are interdigitized such that at least one line exists that passes sequentially through a first capsule of the first array portion, a first capsule of the second array portion, and a second capsule of the first array portion.

10. The device of claim 9, wherein the first ply includes a metal selected from aluminum, stainless steel, or both.

11. The device of claim 9, wherein the thermal energy storage material has a heat storage density from 300° C. to 80° C. greater than 1 MJ/l.

12. The device of claim 9, wherein the insulated housing is at least partially covered by an insulated container that is vacuum insulated.

13. A method for producing a heat storage device comprising:
   i) deforming a first metal foil such that a first ply having a trough is formed;
   ii) at least partially filling the trough with a thermal energy storage material;
   iii) heating the thermal energy storage material for a time and temperature above the liquidus temperature of the thermal energy storage material such that the thermal energy storage material is essentially free of water;
   iv) placing a second ply of the metal foil on top of the first ply such that a surface of the first ply and a surface of the second ply are in partial contact; and
   v) sealing a portion of the facing surfaces of the first ply and the second ply, such that a blister pack containing a plurality of capsules containing the thermal energy storage material is formed, the capsules are in thermal conducting relation with each other, and the thermal energy storage material is prevented from escaping from the capsules during operation in their intended environment;
   wherein the device includes a housing having an internal volume, an array of capsules within the housing, and a thermal energy storage material contained in the capsules, wherein the device exhibits an average initial power density of heat transferred to a heat transfer fluid of at least 8 kW/L based on the internal volume of the housing wherein the average initial power density is defined over an initial 30 seconds, wherein the average initial power density is measured on the device having an initial temperature of 280° C. in the housing, and the heat transfer fluid having an initial temperature of 10° C.; wherein the thermal energy storage material is encapsulated between two metal plies, the metal plies have a thickness on the order of $10^{-1}$ to $10^2$ μm, the capsules have a thickness from 0.5 mm to 20 mm, the volume fraction of the thermal energy storage material in the housing is 0.5 or more, the housing includes an inlet and an outlet and one or more flow paths for flowing a heat transfer fluid through the housing, and wherein the one or more flow paths and the array of capsules are arranged so that the device has the required average initial power density.

14. The method for producing a heat storage device of claim 13, wherein the step of sealing a surface of the first ply and a surface of the second ply includes a step selected from the group consisting of diffusion bonding, brazing, heat welding, adhesive bonding, laser welding, ultrasonic welding, or any combination thereof.

15. The method of claim 14, wherein the thermal energy storage material is a liquid when sealing in step (iv).

16. The method of claim 14, wherein the time of heating is such that the thermal energy storage material is a liquid for at least 5 minutes.

17. The method of claim 16, wherein the temperature of heating is at least 25° C. above the liquidus temperature of the thermal energy storage material, and wherein the thermal energy storage material is comprised of a metal nitrite, metal nitrate or a combination thereof.

18. The method of claim 17, wherein the thermal energy storage material is comprised of a lithium salt, a sodium salt, a potassium salt, or any combination thereof.

19. The method of claim 17, wherein the heating is performed under an atmosphere having a partial pressure of water of at most 1 Pa.

* * * * *